(12) United States Patent
Yi

(10) Patent No.: US 11,321,912 B2
(45) Date of Patent: May 3, 2022

(54) SYSTEM AND METHOD FOR GENERATING A FULL THREE-DIMENSIONAL (3D) DIGITAL GEOMETRY FOR AN EAR

(71) Applicant: Xyken, LLC, McLean, VA (US)

(72) Inventor: Steven Yi, Vienna, VA (US)

(73) Assignee: XYKEN, LLC, McLean, VA (US)

( * ) Notice: Subject to any disclaimer, the term of this patent is extended or adjusted under 35 U.S.C. 154(b) by 114 days.

(21) Appl. No.: 17/037,430

(22) Filed: Sep. 29, 2020

(65) Prior Publication Data

US 2022/0101595 A1    Mar. 31, 2022

(51) Int. Cl.
| | |
|---|---|
| *G06T 15/20* | (2011.01) |
| *G06T 17/10* | (2006.01) |
| *G06K 9/62* | (2022.01) |
| *G06K 7/14* | (2006.01) |
| *G06T 7/194* | (2017.01) |
| *G06N 3/08* | (2006.01) |
| *G06V 10/44* | (2022.01) |
| *G06V 20/40* | (2022.01) |

(52) U.S. Cl.
CPC .......... *G06T 15/205* (2013.01); *G06K 7/1417* (2013.01); *G06K 9/6215* (2013.01); *G06N 3/08* (2013.01); *G06T 7/194* (2017.01); *G06T 17/10* (2013.01); *G06V 10/443* (2022.01); *G06V 20/46* (2022.01); *G06T 2207/10021* (2013.01); *G06T 2207/10028* (2013.01); *G06T 2207/20084* (2013.01); *G06T 2207/20101* (2013.01)

(58) Field of Classification Search
CPC ................... G06T 15/205; G06T 17/10; G06T 2207/10021; G06T 2207/20101; G06K 9/6215; G06N 3/08; G06V 10/443; G06V 20/46
See application file for complete search history.

(56) References Cited

U.S. PATENT DOCUMENTS

| | | | | |
|---|---|---|---|---|
| 2014/0072140 A1* | 3/2014 | Hankey | ................... | G06F 30/00 |
| | | | | 381/74 |
| 2019/0014431 A1* | 1/2019 | Lee | ........................... | G06T 7/62 |

* cited by examiner

Primary Examiner — Grace Q Li

(57) ABSTRACT

A system and method for generating a full three-dimensional (3D) digital geometry for an ear provides a 3D reconstruction model that not only includes the outer area of an ear, but also the inner canal area up to the second bend. The system includes at least one remote server and a PC device. The remote server manages and processes data needed for the 3D model for an ear. The PC device allows a user to access the system and method. The remote server processes a series of video frames to generate outer ear 3D data points. Full ear geometry 3D data points are generated by comparing the outer ear 3D data points with a plurality of ear impressions. Canal 3D data points are then adjusted with a tragus angle for accuracy. The 3D reconstruction model that includes the outer ear area and inner canal area is finally generated.

17 Claims, 28 Drawing Sheets

SYSTEM AND METHOD FOR GENERATING A FULL THREE-DIMENSIONAL (3D) DIGITAL GEOMETRY FOR AN EAR

The current application is a continuation-in-part (CIP) application of a U.S. non-provisional application Ser. No. 16/212,964 filed on Dec. 7, 2018.

FIELD OF THE INVENTION

The present invention relates generally to data processing for three-dimensional (3D) digital models. More specifically, the present invention is a system and method for generating a full 3D digital geometry for an ear.

BACKGROUND OF THE INVENTION

Current methods of making custom-fit shells for hearing aids still starts with taking an ear impression of a patient's ear at the audiologist or dispenser's office. This 1950's technology is a two-part silicone resin that is injected into the patient's ear canal using a disturbingly large syringe. The material sits in the patient's ear canal for 15 minutes until it hardens and is removed. The process is time-consuming, invasive, and not especially accurate since it does not capture the way the ear canal changes shape while a person speaks or chews. Once ready, the impressions have to be shipped to a manufacturer's laboratory for 3D scanning, digital modeling, fabrication, and modification.

Unfortunately, the hearing aid produced based on an ear impression is rarely perfect because each step brings in different levels of errors, for example impression deformation from material hardening and during storage, impression degradation or potential damage due to shipping, and modeling variations resulted from different technicians' skills. The lack of efficient service delivery has contributed to the lack of satisfactory quality. Efforts have been made to recover the 3D ear geometry through various direct ear 3D imaging systems employing either structured light-based 3D or laser 3D. However, no success is reported through video-based 3D reconstruction, especially for the full ear geometry covering from outer ear to the canal extending to the second bend.

There are many methods of reconstructing or obtaining 3D surface information of a target/object through image processing or computer vision algorithms. Typical methods include structure from motion or SFM, structured light, laser scanning, and time of flight (TOF). A common problem with these methods is that the obtained 3D result always has unwanted background reconstructed along with the target of interest. This is true no matter whether it is for controlled or uncontrolled environment.

Similarly, direct 3D imaging on ear canal possesses challenges. The high surface curvature, canal bending, and small canal size all make it difficult to image ear canal to the second bend without using specially designed setup. Currently, two commercial products have been developed to acquire ear canal geometry. Lantos uses an inflated balloon (contact based) and OtoScan uses miniature laser scanner (incomplete data as a common situation due to the small scanning area). The conclusion: regardless of which method being used today, it is difficult to obtain a complete ear canal geometric model to the second bend.

It is therefore an objective of the present invention to provide a system and method for generating a full three-dimensional (3D) digital geometry for an ear. The present invention is an improvement for reconstructing 3D ear models which are used to create a custom-fit hearting aid shell or earphone. The present invention includes a 3D reconstruction process in order to generate 3D outer ear data points. Using a 3D ear impression database and 3-step registration process, the present invention includes a process in order to generate full ear geometry 3D data points. The full ear geometry 3D data points include canal 3D data points which are adjusted using a tragus angle for improve accuracy of the full ear geometry 3D model. The present invention further includes multiple methods in order to scale full ear geometry 3D model. Thus, the present invention can be used to generate a full ear geometry 3D model which includes ear canal geometric data to the second bend.

DETAIL DESCRIPTIONS OF THE INVENTION

All illustrations of the drawings are for the purpose of describing selected versions of the present invention and are not intended to limit the scope of the present invention.

Figure 1:
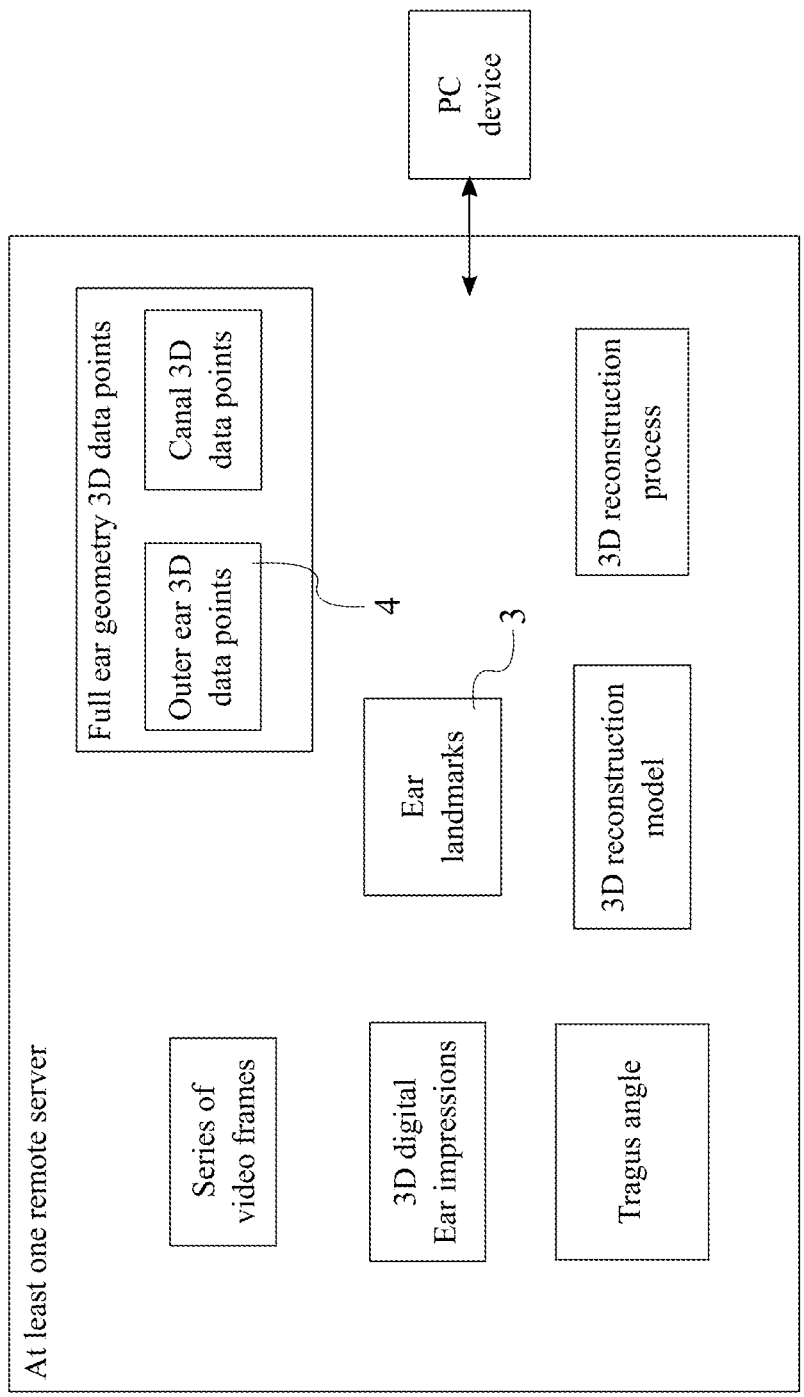
FIG. 1 is a diagram illustrating the system of the present invention.

In reference to FIGS. 1 through 19, the present invention is a system and method for generating a full three-dimensional (3D) digital geometry for an ear. The present invention is an improvement for reconstructing 3D models of ears to be used to create a custom-fit hearing aid shell or earphone. In further detail, the present invention reconstructs a 3D model of not only the outer area of an ear, but also the inner canal area up to the second bend of an ear. With reference to FIG. 1, the system of the present invention includes a personal computing (PC) device and at least one remote server (Step A). A plurality of 3D digital ear impressions is stored on the remote server. The PC device may be any type of computing device such as, but is not limited to, a mobile phone, a mobile tablet, a desktop computer, or a notebook computer. The PC device allows a user to use the present invention in order to reconstruct a 3D model of an ear. Further, the PC device preferably includes a means to record a video. If the PC device does not include a means to record a video, an external device may be used to record a video and said video can be transferred to the PC device. The remote server is preferably a cloud server which is used to manage the processes of the present invention. In another embodiment, the PC device may be used to manage the processes of the present invention instead of the remote server if the PC device includes sufficient hardware. The plurality of 3D digital ear impressions includes 3D data up to the second bend 6 of the canal area. Thus, the plurality of 3D digital ear impressions is used to manipulate data and therefore, produce a 3D model that includes the inner canal area.

Figure 2A:
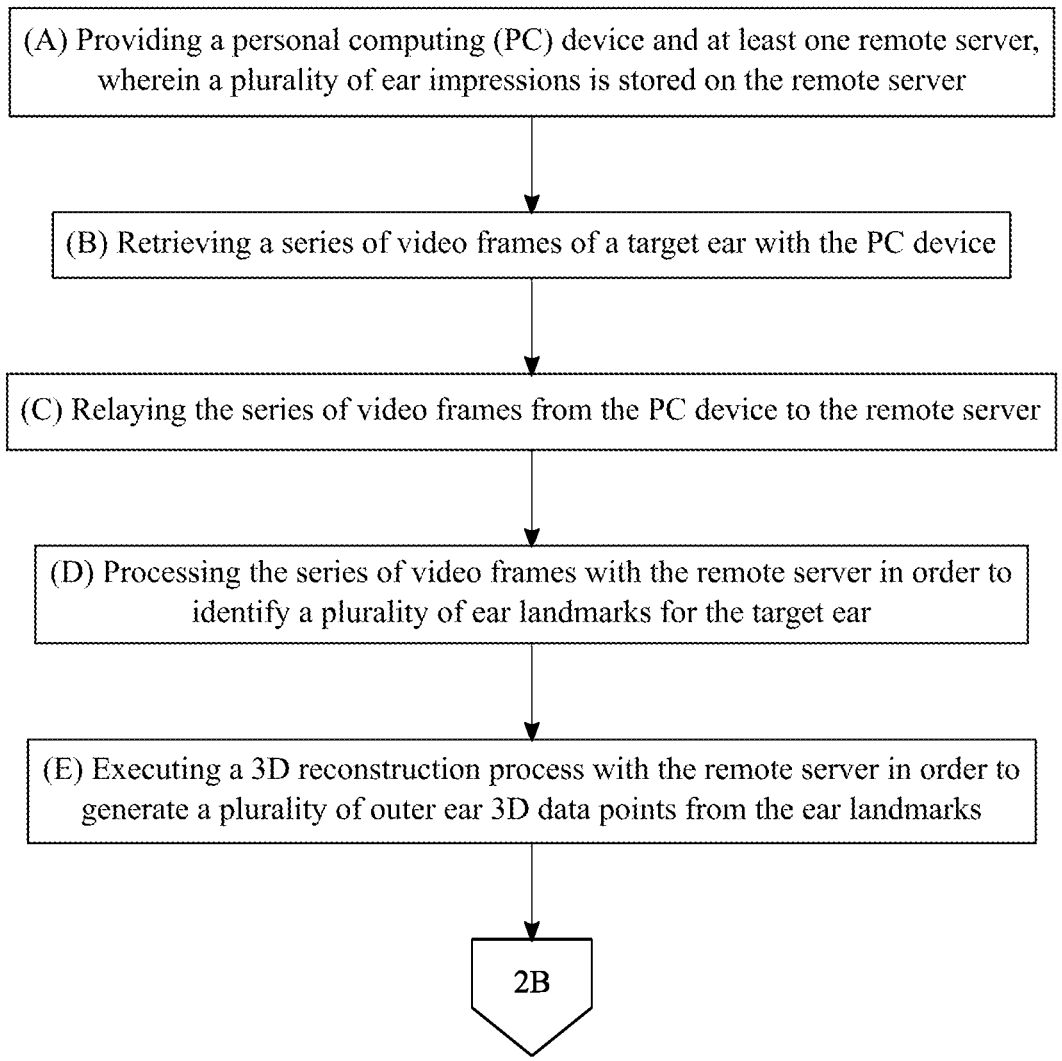
FIG. 2A is a flowchart illustrating an overall process of the method of the present invention.
Figure 3:
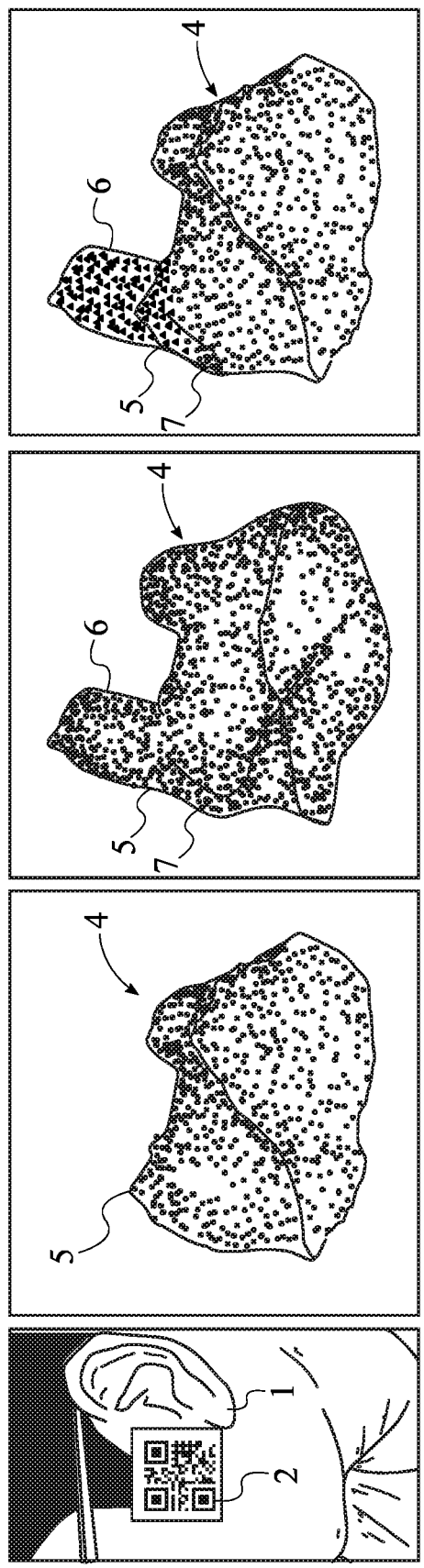
FIG. 3 is a diagram illustrating the 3D reconstruction process in Step E.

With reference to FIG. 2A, the method of the present invention follows an overall process that reconstructs a 3D model that includes the outer area of an ear and the inner canal area up to the second bend of an ear. A series of video frames of a target ear 1 is retrieved with the PC device (Step B). The series of video frames of a target ear 1 is a set of image frames from a video recording of an ear. The series of video frames can directly be recorded with the PC device if the PC device includes a means to record a video, or the series of video frames can be recorded using an external video-recording device and then transferred to the PC device. The series of video frames is relayed from the PC device to the remote server (Step C). Thus, the series of video frames can be managed with the remote server. The series of video frames is processed with the remote server in order to identify a plurality of ear landmarks 3 for the target ear 1 (Step D). The series of video frames can be processed through various methods in order to separate the target ear 1 from a background and to identify ear landmarks 3. Ear landmarks 3 are distinct identifiable parts of the outer area of an ear. With reference to FIG. 3, a 3D reconstruction process is executed with the remote server in order to generate a plurality of outer ear 3D data points 4 in accordance to the ear landmarks 3 (Step E). The plurality of outer ear 3D data points includes 3D data of only the outer area of an ear. The 3D reconstruction process uses traditional multi-view structure from motion (SFM) algorithm for 3D reconstruction. The 3D reconstruction process is further disclosed in the U.S. patent application Ser. No. 16/212,964 "Method and System of Discriminative Recovery of Three-Dimensional Digital Data of a Target of Interest in a Cluttered or Controlled Environment". Through the 3D reconstruction process, the series of video frames are optimally sampled based on camera viewing angles to get distributed camera viewing directions. A plurality of selected video frames covers all viewing angles of the target ear 1. The output of the 3D reconstruction process provides good 3D geometry of the ear base; however, data is limited for the tragus inner wall 7 and around both the first bend 5 and second bend 6 of the ear canal.

Figure 2B:
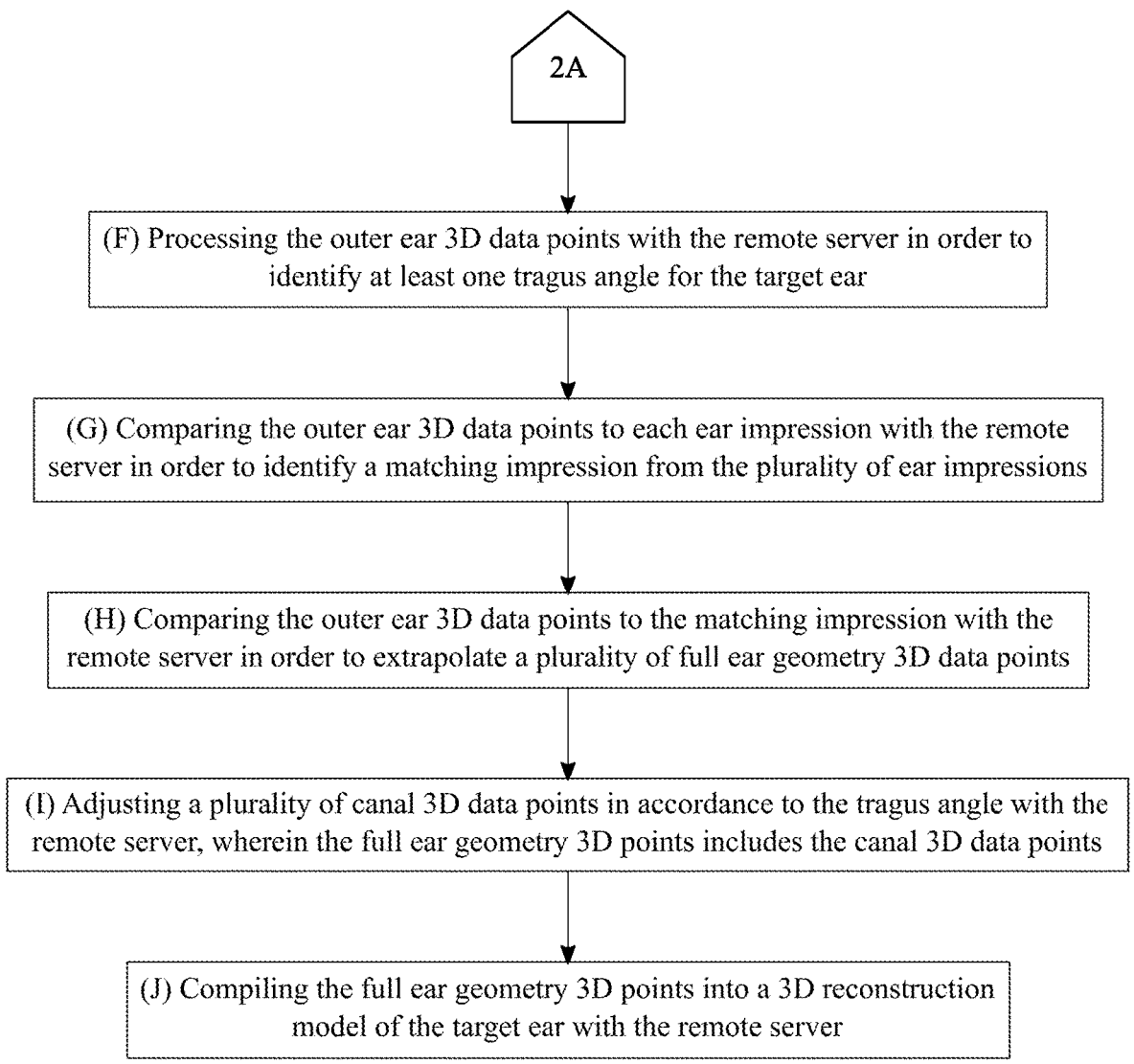
FIG. 2B is a continuation from FIG. 2A.

As can be seen in FIG. 2B, the outer ear 3D data points 4 is processed with the remote server in order to identify at least one tragus angle for the target ear 1 (Step F). The outer ear 3D data points 4 can be process through various methods in order to identify the tragus angle. The tragus angle is the orientation or angle on the canal wall of the ear between the tragus tip and the first bend 5. The outer ear 3D data points 4 is compared to each 3D digital ear impression with the remote server in order to identify a matching impression among the plurality of 3D digital ear impressions (Step G). The matching impression is a digital 3D digital ear impression that is similar in appearance to the model of the target ear 1. The outer ear 3D data points 4 is registered to the matching impression with the remote server in order to extrapolate a plurality of full ear geometry 3D data points (Step H). In further detail, the matching impression is used to generate 3D data points for the canal area of the target area. A plurality of canal 3D data points is adjusted in accordance to the tragus angle with the remote server (Step I). The plurality of full ear geometry 3D points includes the plurality of canal 3D data points. The plurality of canal 3D data points is adjusted in order to accurately reconstruct a model based on the anatomy of the target rather than just use the anatomy of the matching impression. The full ear geometry 3D data points are compiled into a 3D reconstruction model of the target ear 1 with the remote server (Step J). In further detail, the 3D reconstruction process from Step E is executed with the remote server in order to generate the 3D reconstruction model in accordance to the full ear geometry 3D data points. Thus, the 3D reconstruction model includes the outer area of the target ear 1 and the inner canal area up to the second bend 6.

Figure 4:
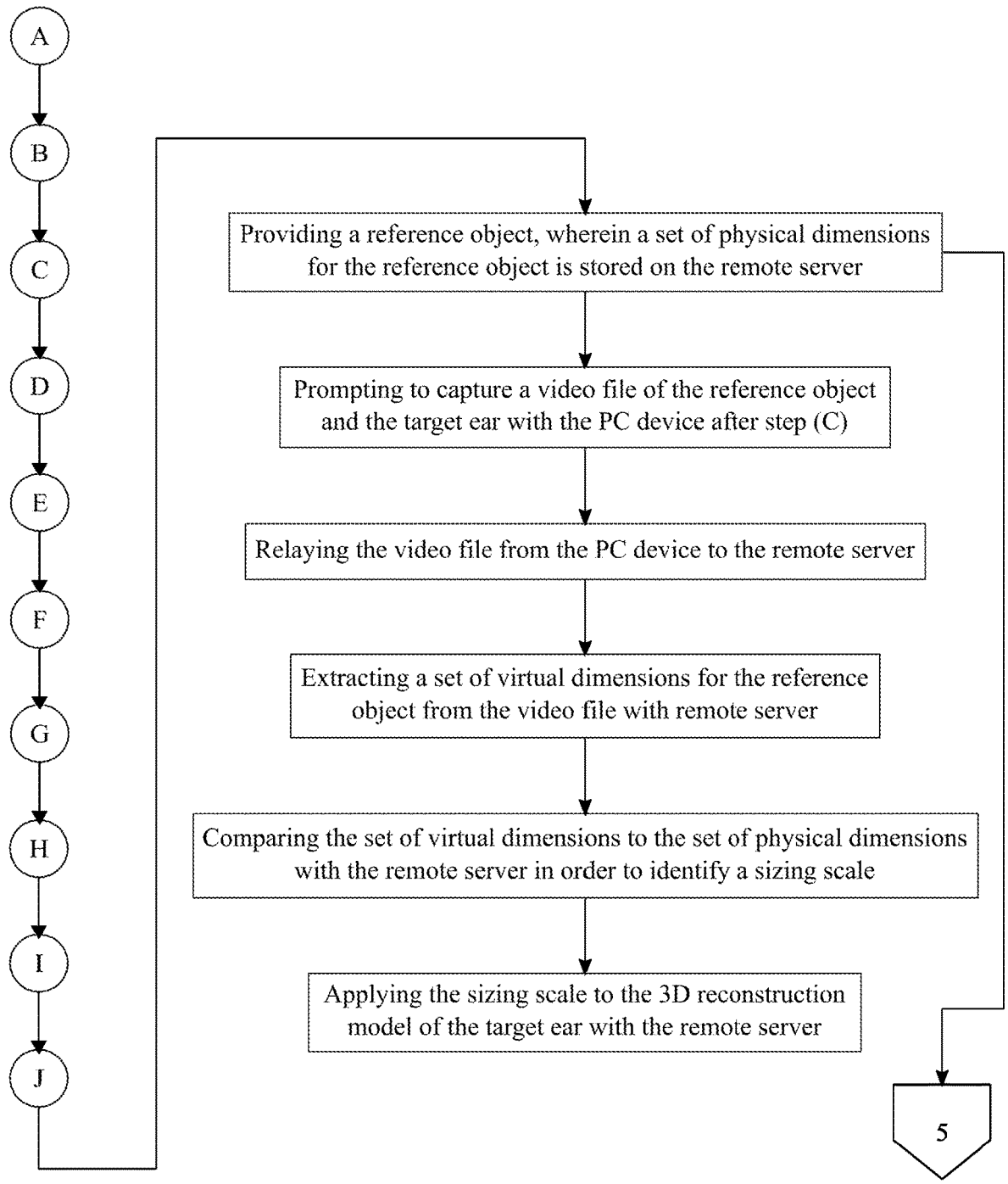
FIG. 4 is a flowchart illustrating one subprocess for sizing the 3D reconstruction model using a reference object.
Figure 6:
FIG. 6 is a diagram illustrating the reference object adjacent to the target ear.

With reference to FIGS. 4 and 6, the following subprocess is one method on how the 3D reconstruction model can be appropriately sized. A reference object 2 is provided for the present invention. The reference object 2 may be any object and a set of physical dimensions for the reference object 2 is stored on the remote server. The PC device begins by prompting to capture a video file of the reference object 2 and the target ear 1 after Step C. In further detail, a video is recorded of the target ear 1 with the reference object 2 adjacent to the target ear 1. The video file is relayed from the PC device to the remote server. Thus, the remote server can manage the video file. A set of virtual dimensions for the reference object 2 is extracted from the video file with the remote server. The set of physical dimensions and the set of virtual dimensions for the reference object 2 are obtained using the 3D reconstruction from stereo or triangulation principle. The remote server compares the set of virtual dimensions to the set of physical dimensions in order to identify a sizing scale. The sizing scale is used to provide dimensions to the 3D model. The remote server applies the sizing scale to the 3D reconstruction model of the target ear 1 so that the remote server has access to an accurately-sized virtual representation of the target ear 1.

Figure 5:
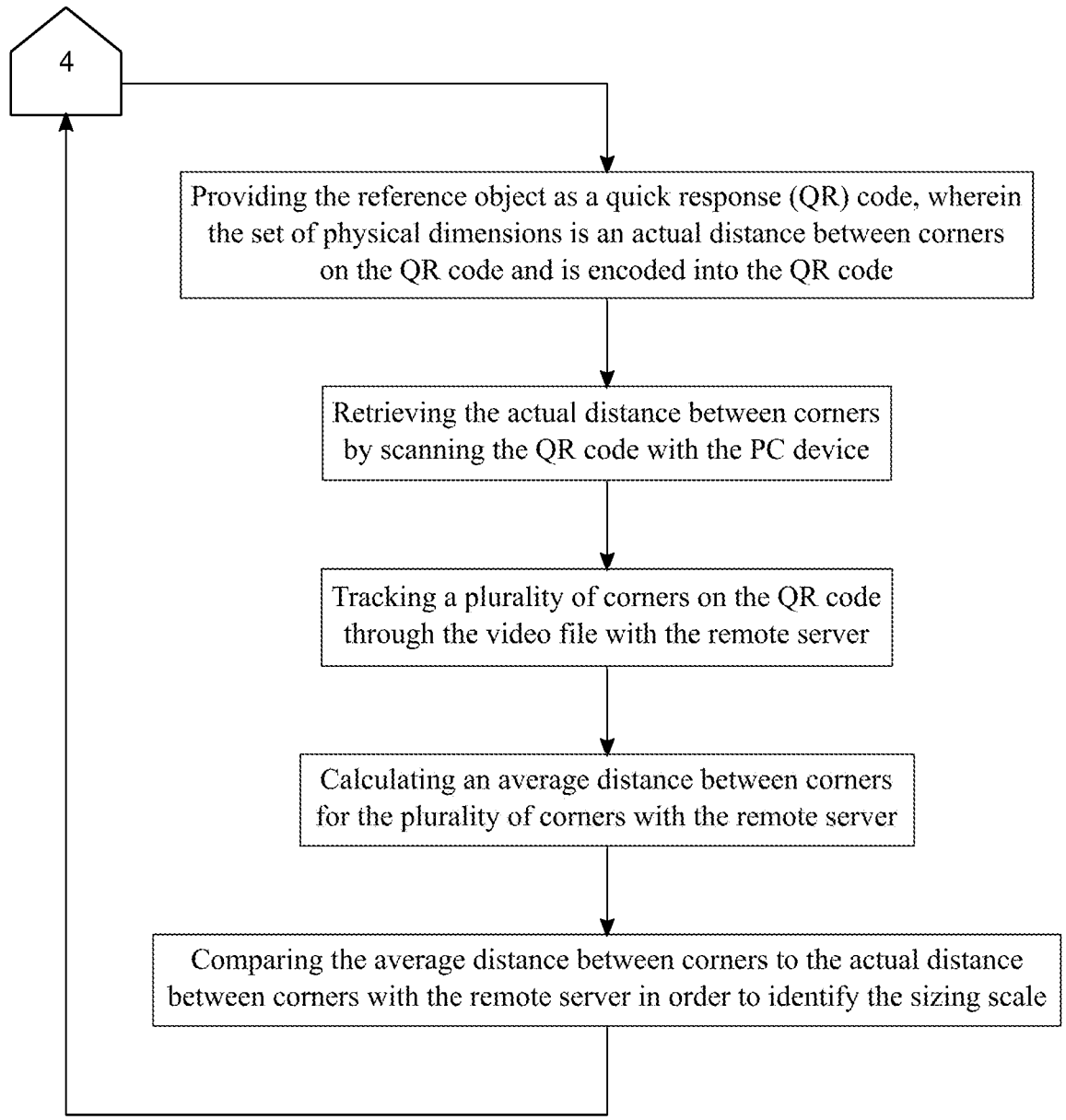
FIG. 5 is a flowchart illustrating a subprocess of using a quick response code as the reference object.

With reference to FIGS. 5 and 6, the subprocess following the method provides the reference object 2 as a quick response (QR) code. The set of physical dimensions is an actual distance between corners on the QR code and is encoded into the QR code. The PC device retrieves the actual distance between corners by scanning the QR code. The remote server tracks a plurality of corners on the QR code through the video file. The plurality of corners includes 3 physical corners and one virtual corner on the QR code. The remote server calculates an average distance between corners for the plurality of corners. The remote server compares the average distance between corners to the actual distance between corners in order to identify the sizing scale. Finally, the 3D reconstruction model of the target ear 1 generated from Step J is re-scaled using the sizing scale.

Figure 7:
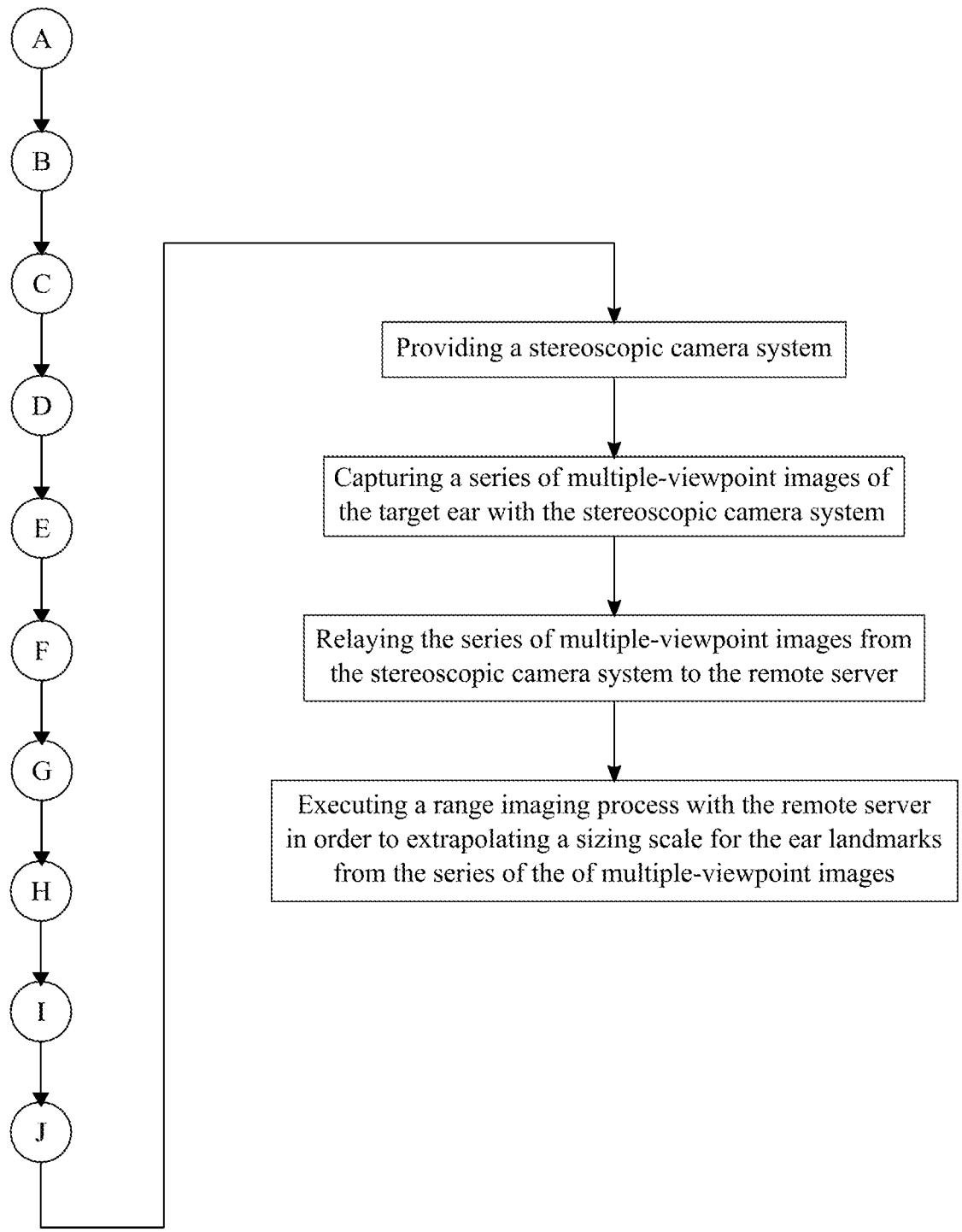
FIG. 7 is a flowchart illustrating another subprocess for sizing the 3D reconstruction model using a stereoscopic camera system.

With reference to FIG. 7, the following subprocess is another method on how the 3D reconstruction model can be appropriately sized. A stereoscopic camera system is provided for this other method. The stereoscopic camera system is a camera system that includes two lens, and the distance between each lens is known. A series of multiple-viewpoint images of the target ear 1 is captured with the stereoscopic camera system. The series of multiple-viewpoint images is a set of image frames of a video recorded by the stereoscopic camera system. The series of multiple-viewpoint images is relayed from the stereoscopic camera system, through the PC device, and to the remote server. Thus, the remote server can manage the series of multiple-viewpoint images. A range imaging process is executed with the remote server in order to extrapolate a sizing scale for the ear landmarks 3 form the series of multiple-viewpoint images. The range imaging process allows the size of an object recorded in a video to be measured. Thus, the 3D reconstruction model of the target ear 1 can be appropriately sized.

Figure 8:
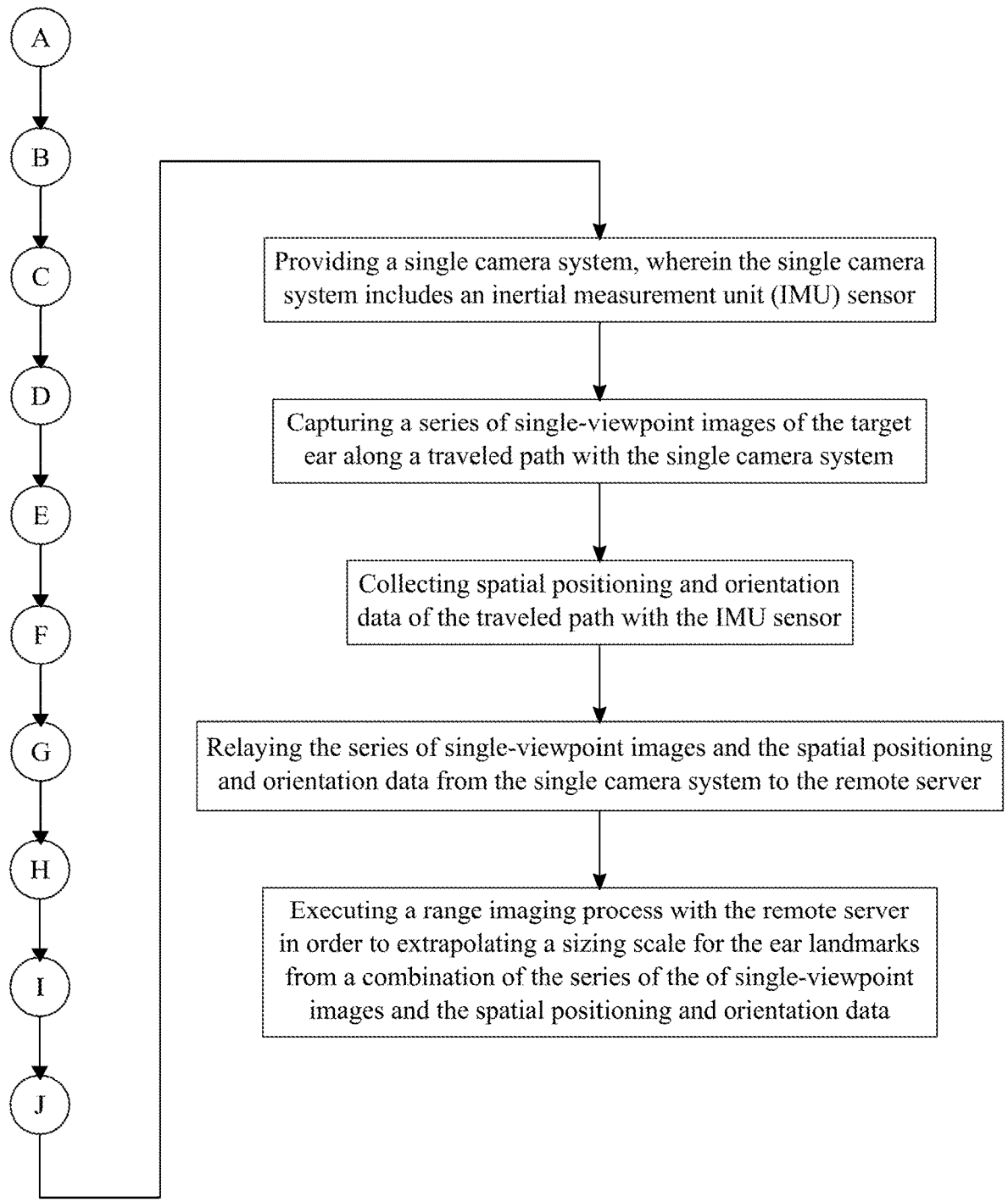
FIG. 8 is a flowchart illustrating another subprocess for sizing the 3D reconstruction model using a single camera system with an IMU.

With reference to FIG. 8, the following subprocess is another method on how the 3D reconstruction model can be appropriately sized. A single camera system is provided for this other method, and the single camera system includes an inertial measurement unit (IMU) sensor. The single camera system is a single camera with a single lens. The IMU sensor allows distance and movement data of the single camera system to be collected. A series of single-viewpoint images of the target ear 1 is captured along a traveled path with the single camera system. In further detail, the single camera system records a video of the target ear 1 from one point to another. Spatial positioning and orientation data of the traveled path is collected with the IMU sensor. Thus, the distance of the traveled path can be calculated. The series of single-viewpoint images and the spatial positioning and orientation data is relayed from the single camera system, through the PC device, and to the remote server. Thus, the series of the single-viewpoint images and the spatial positioning and orientation data can be managed by the remote server. A range imaging process is executed with the remote server in order to extrapolate a sizing scale for the ear landmarks 3 from a combination of the series of single-viewpoint images and the spatial positioning and orientation data. Thus, the 3D reconstruction model of the target ear 1 can be appropriately sized.

Figure 9:
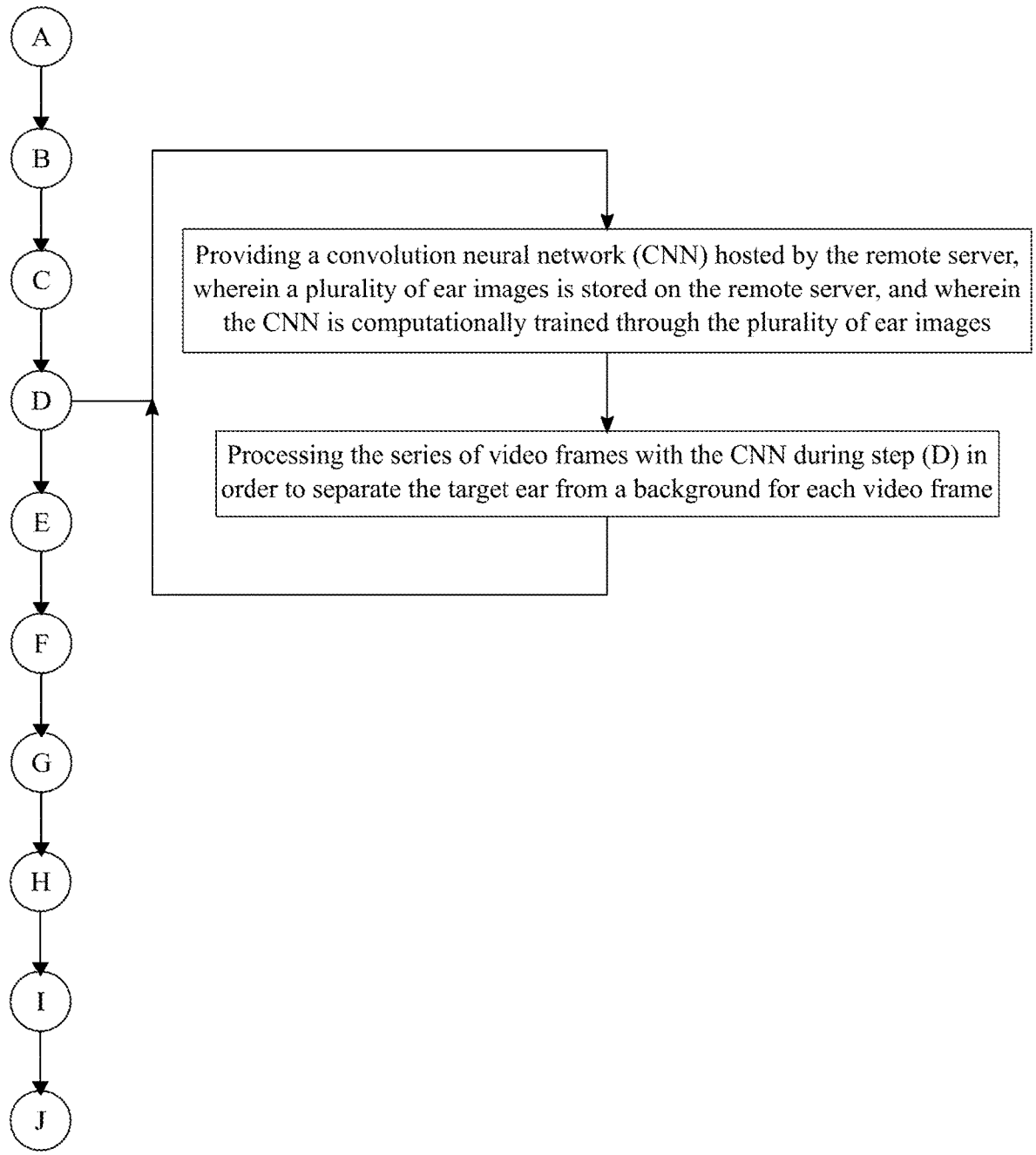
FIG. 9 is a flowchart illustrating one subprocess for separating the target ear from a backdrop using a CNN.

With reference to FIG. 9, the following subprocess is one method on how the target ear 1 can be separated from a background. A convolutional neural network (CNN) is hosted on the remote server. A plurality of ear images is stored on the remote server. The plurality of ear images is a set of pictures of various ears. The CNN is a deep learning neural network that is computationally trained through the plurality of ear images. The CNN processes the series of video frames during Step D in order to separate the target ear 1 from a background for each video frame. Thus, the target ear 1 is separated from the background.

Figure 10:
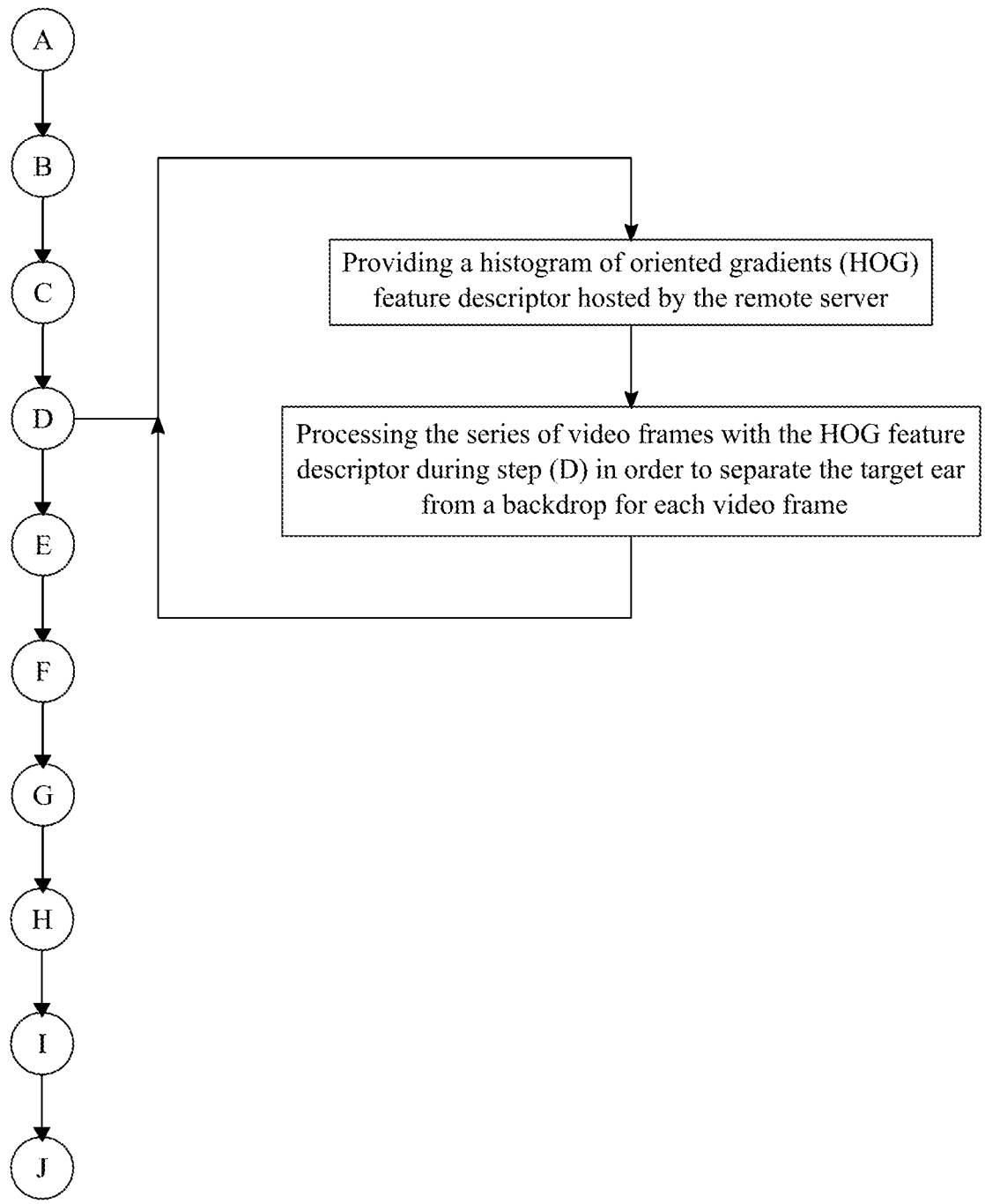
FIG. 10 is a flowchart illustrating another subprocess for separating the target ear from a backdrop using a HOG feature descriptor.

With reference to FIG. 10, the following subprocess is an alternative method on how the target ear 1 can be separated from a background. A histogram of oriented gradients (HOG) feature descriptor is hosted on the remote server. The HOG feature descriptor is a feature descriptor that processes images for the purpose of object detection. The HOG feature descriptor processes the series of video frames during Step D in order to separate the target ear 1 from a background for each video frame. Thus, the target ear 1 is separated from the background.

Figure 11:
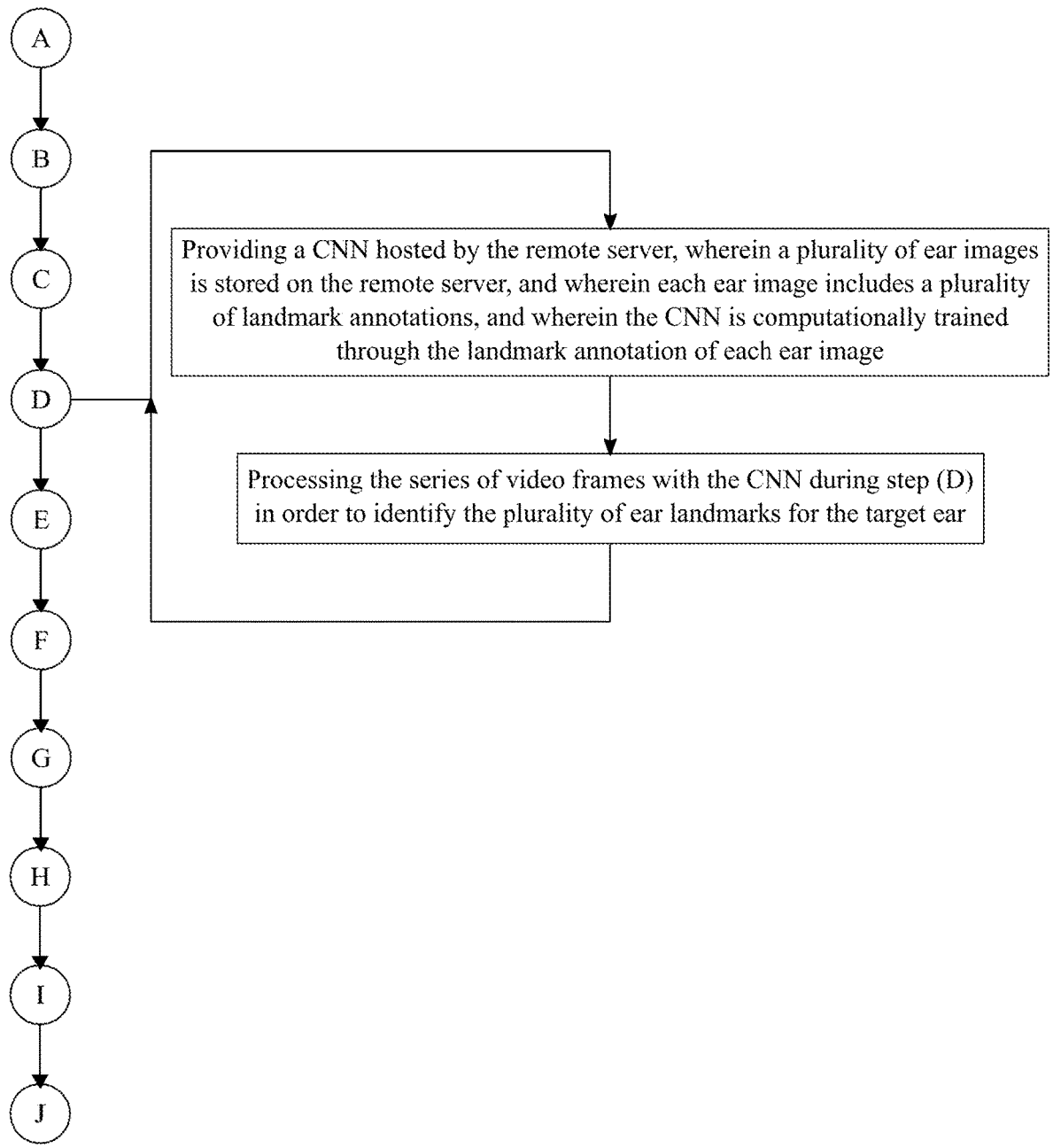
FIG. 11 is a flowchart illustrating one subprocess for identifying ear landmarks for the target ear using a CNN.
Figure 13:
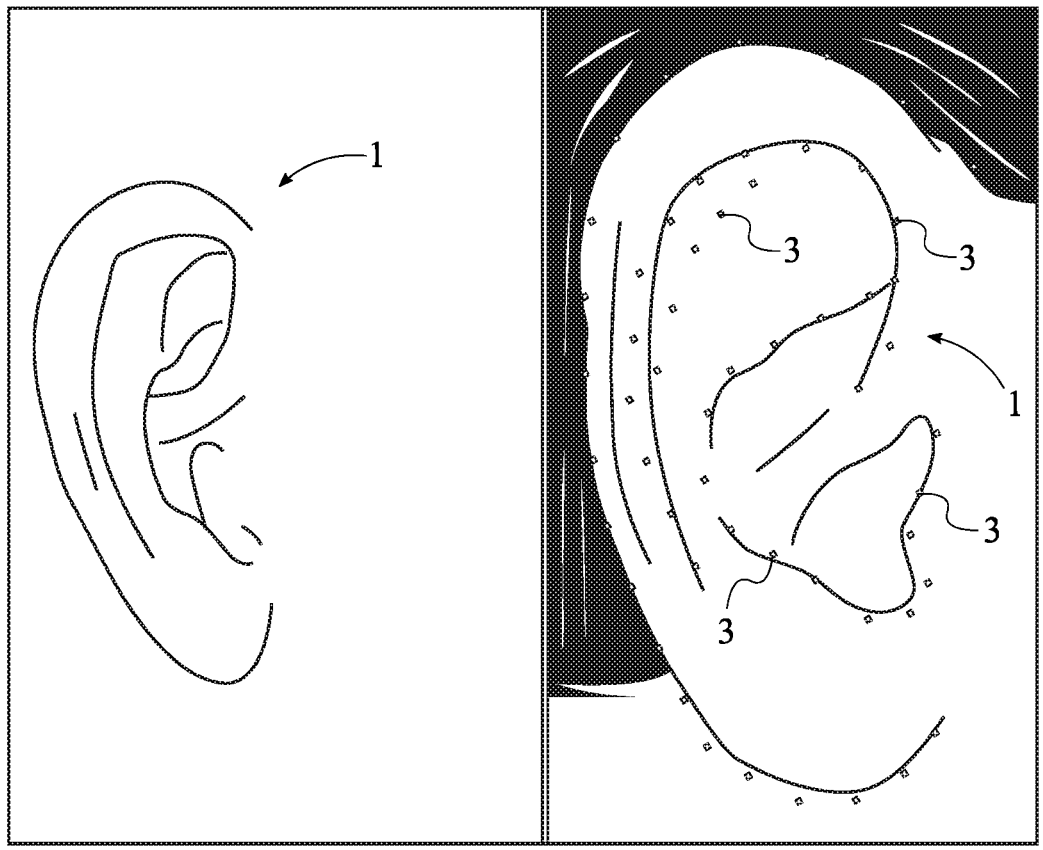
FIG. 13 is a diagram illustrating the ear landmarks for the target ear.

With reference to FIGS. 11 and 13, the following subprocess is one method on how ear landmarks 3 are identified for the target ear 1. Another CNN is hosted on the remote server. Each ear image, stored on the remote server, includes a plurality of landmark annotations. The plurality of landmark annotations is a set of labeled parts of an ear. The CNN is computationally trained through the landmark annotations of each ear image. The CNN processes the series of video frames during Step D in order to identify the plurality of ear landmarks 3 for the target ear 1. Thus, the ear landmarks 3 are identified for the target ear 1.

Figure 12:
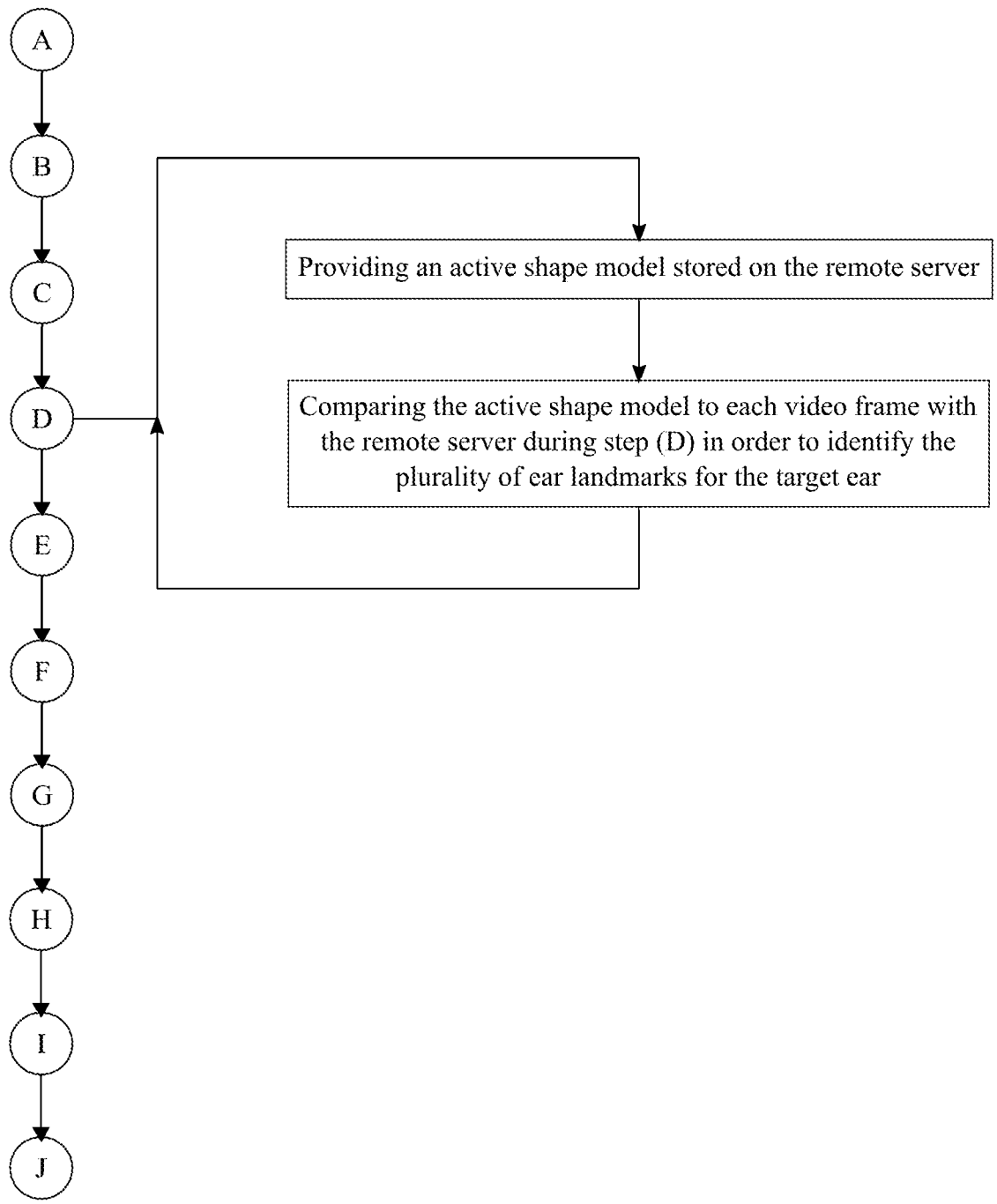
FIG. 12 is a flowchart illustrating one subprocess for identifying ear landmarks for the target ear using an active shape model.

With reference to FIGS. 12 and 13, the following subprocess is an alternative method on how ear landmarks 3 are identified for the target ear 1. An active shape model is stored on the remote server. Predefined ear landmarks 3 are fit into the active shape model. For any unknown image, the active shape model is then used to locate ear landmarks 3. Active shape models are statistical models of the shape of objects which iteratively deform to fit to an example of the object in a new image. The remote server compares the active shape model to each video frame during Step D in order to identify the plurality of ear landmarks 3 for the target ear 1. Thus, the ear landmarks 3 are identified for the target ear 1.

Since the canal wall behind the tragus is generally not visible by the video camera, the reconstructed 3D data tends to be erroneous. The partially-recovered canal wall tends to have an incorrect angle with respect to the base of the ear. The outer ear 3D data points 4 close to the first bend 5 in the canal are also sparse and inaccurate. There is a need to find the correct geometry (or relative orientation on the ear) of this wall/canal for accurate geometry recovery of the ear canal. The present invention obtains the orientation information through the geometric information recovered from the tragus—a visible and recoverable surface. An assumption of the present invention is that the protrusion of the tragus is an extension of the bone which forms the wall behind the tragus in the canal. The orientation of the tragus wall (outside, visible part, or the area formed by tragus landmarks 8) is parallel to the wall in the canal between the tragus tip and the first bend 5.

Figure 14:
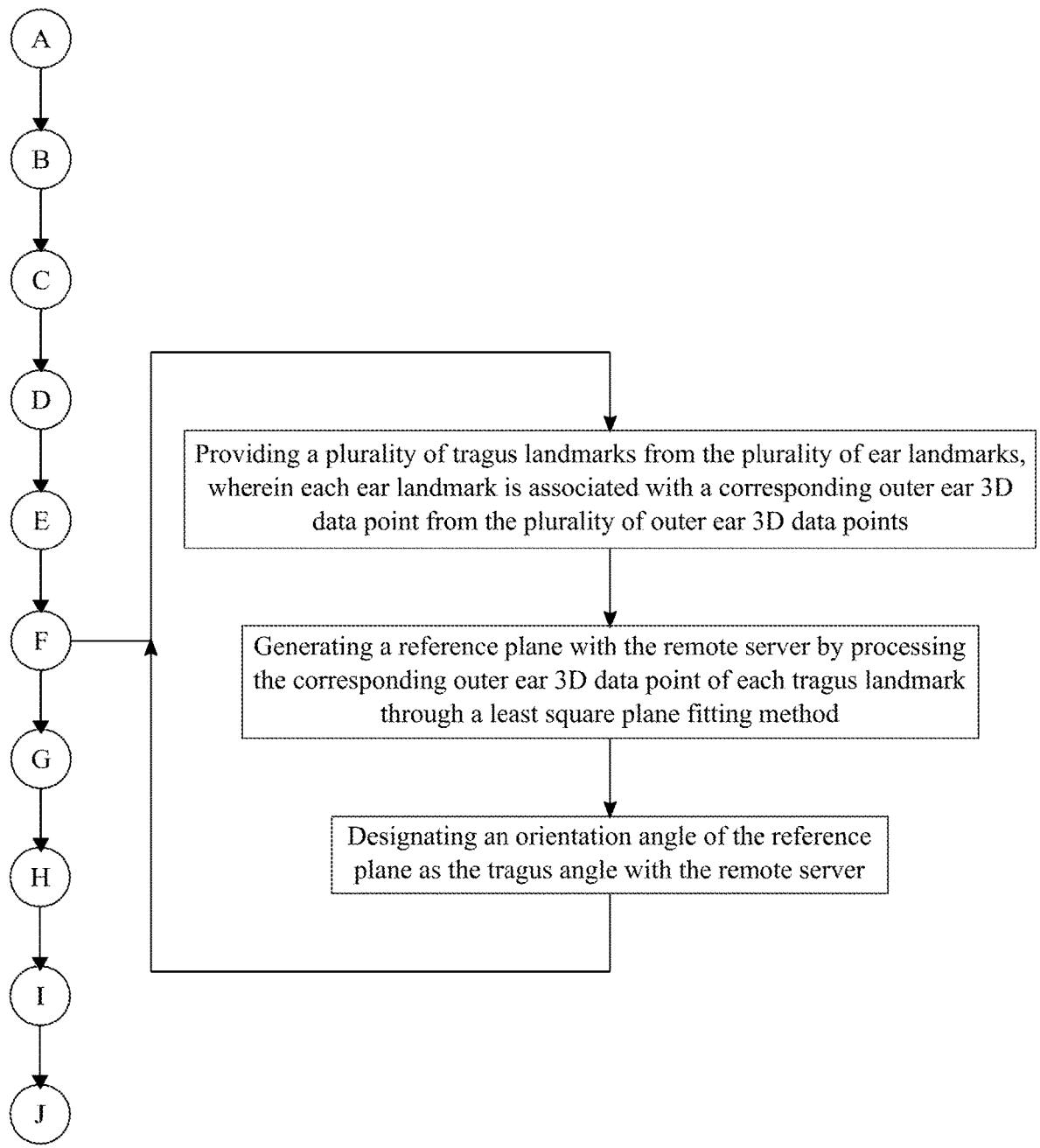
FIG. 14 is a flowchart illustrating one subprocess for identifying a tragus angle.
Figure 15:
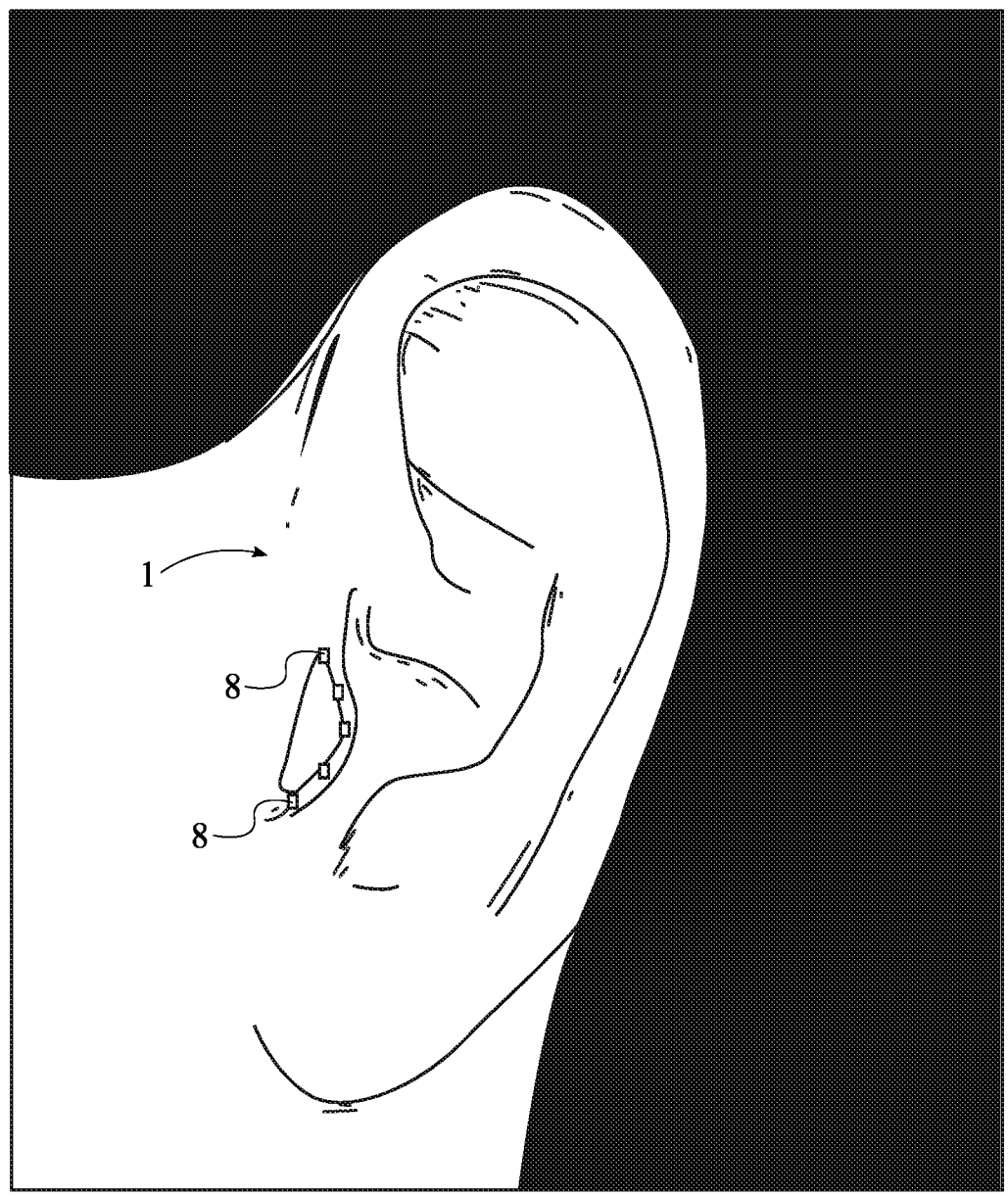
FIG. 15 is a diagram illustrating the tragus landmarks on the target ear.
Figure 16:
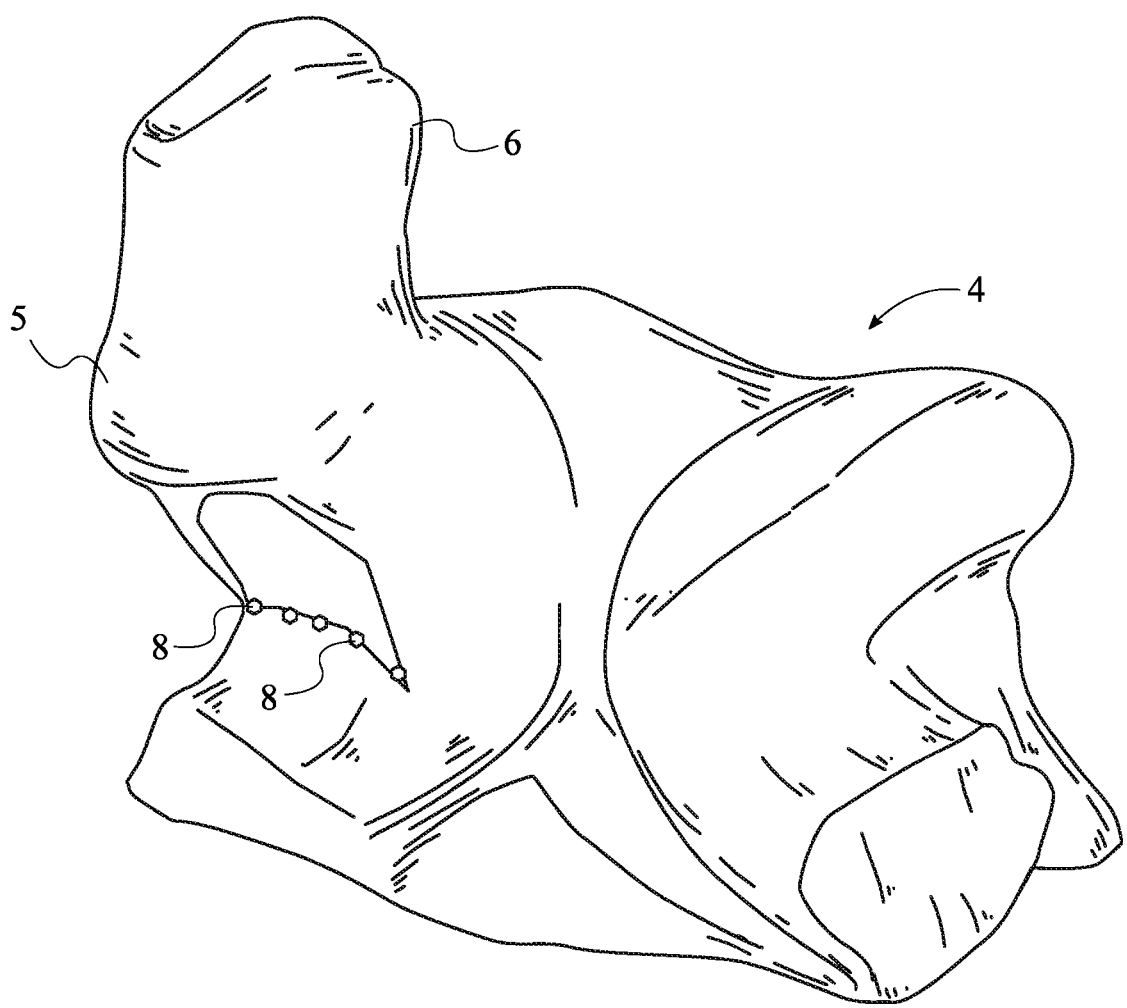
FIG. 16 is a diagram illustrating the tragus angle using the tragus landmarks.

With reference to FIGS. 14 through 16, the following subprocess is one method on how the tragus angle is identified for the target ear 1. A plurality of tragus landmarks 8 is provided from the plurality of ear landmarks 3. Each ear landmark is associated with a corresponding outer ear 3D data point from the plurality of outer ear 3D data points 4. The remote server generates a reference plane by processing the corresponding outer ear 3D data point of each tragus landmark through a least square plane fitting method. The reference plane is expected to be parallel to the inner wall of the canal behind the tragus or between the tragus tip and the first bend 5. The remote server designates an orientation angle of the reference plane as the tragus angle. The orientation angle is the angle of the plane with respect to the plurality of outer ear 3D data points 4. Thus, the tragus angle is identified for the target ear 1.

Figure 17:
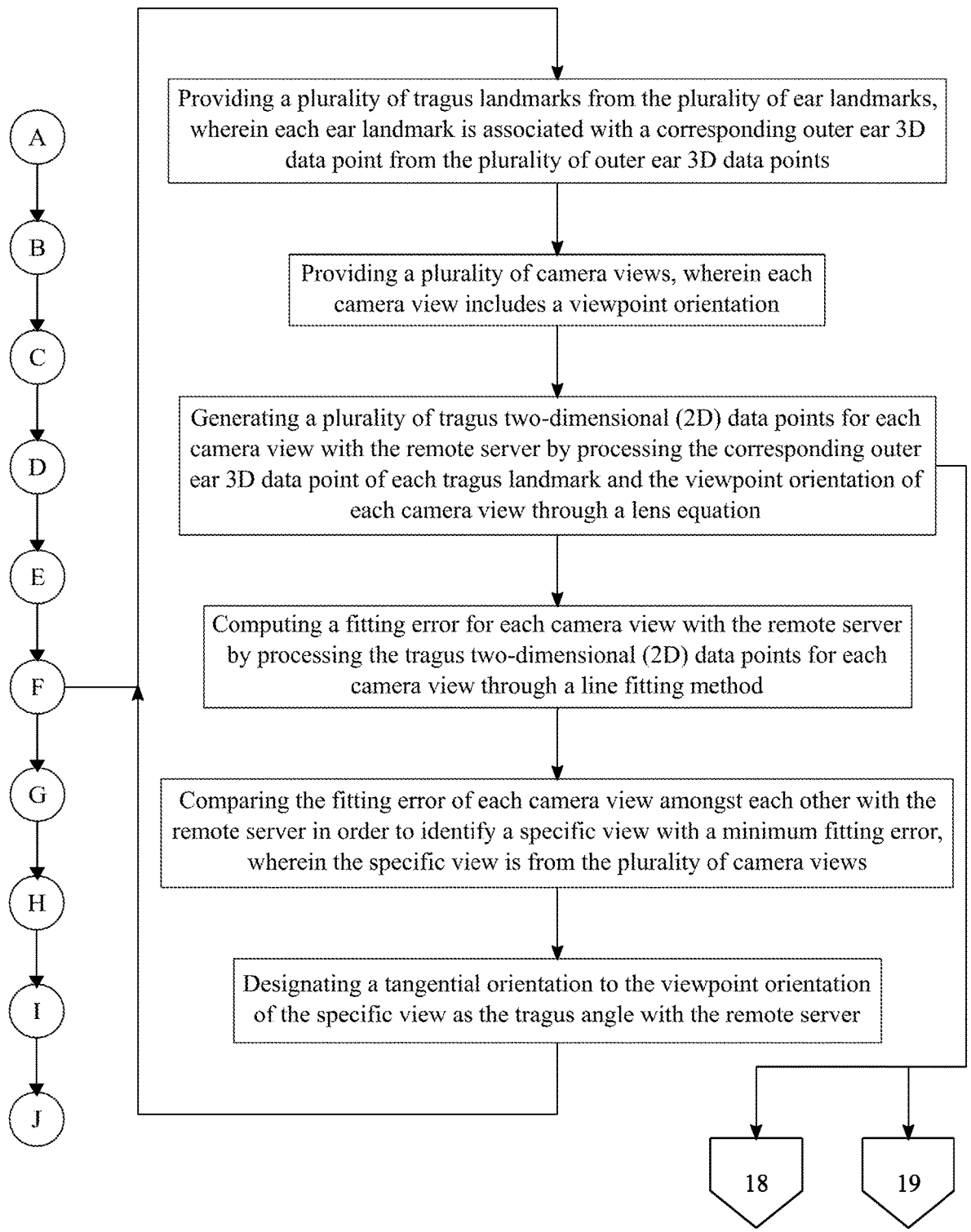
FIG. 17 is a flowchart illustrating another subprocess for identifying a tragus angle.
Figure 20:
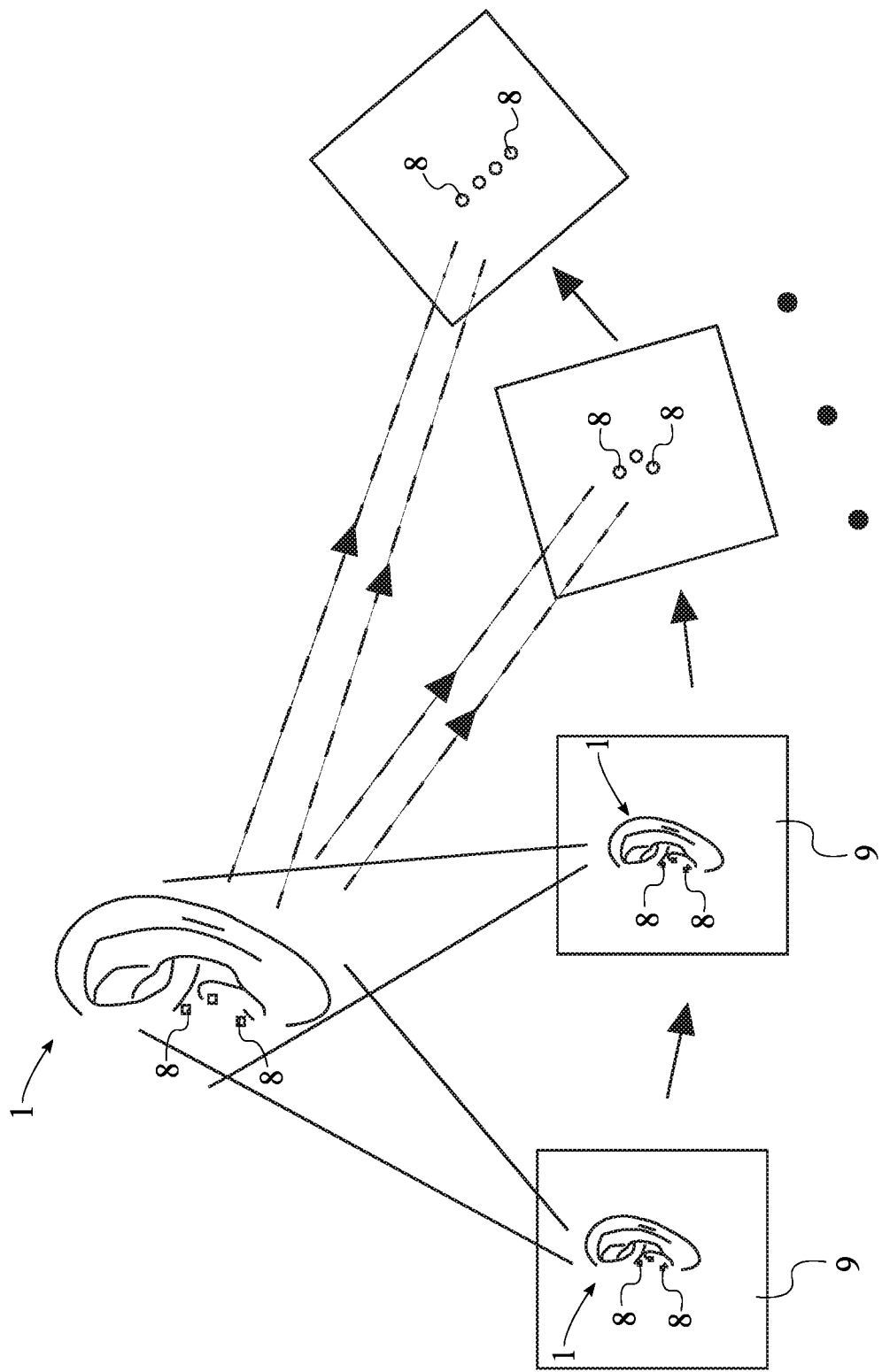
FIG. 20 is a diagram illustrating the subprocess from FIG. 17.

With reference to FIGS. 17 and 20, the following subprocess is another method on how the tragus angle is identified for the target ear 1. A plurality of camera views 9 is provided for this other method. Each camera view includes a viewpoint orientation. The viewpoint orientation is the camera viewing angle. The remote server generates a plurality of tragus two-dimensional (2D) data points for each camera view by processing the corresponding outer ear 3D data point of each tragus landmark and the viewpoint orientation of each camera view through a lens equation. The lens equation is $x=f*X/Z$, $y=f*Y/Z$, where f is the camera focal lens. In further detail, 3D to 2D projection is performed for the tragus landmarks 8 in order to obtain the tragus 2D data points. The remote server computes a fitting error for each camera view by processing the tragus 2D data points for each camera view through a line fitting method. Various line fitting methods can be used such as, but not limited to, a linear regression method or a least square fitting method. The fitting error is an error calculated between the tragus 2D data points and the generated line of the line fitting method. The remote server compares the fitting error for each camera view amongst each other in order to identify a specific view with a minimum fitting error. The specific view is from the plurality of camera views 9. Thus, camera view of the tragus 2D data point with the minimum fitting error with respect to generated line of the line fitting method may be selected. The remote server designates a tangential orientation to the viewpoint orientation of the specific view as the tragus angle. The tangential orientation is the camera viewing angle of the specific view. Thus, the tragus angle can be identified for the target ear 1.

Figure 18:
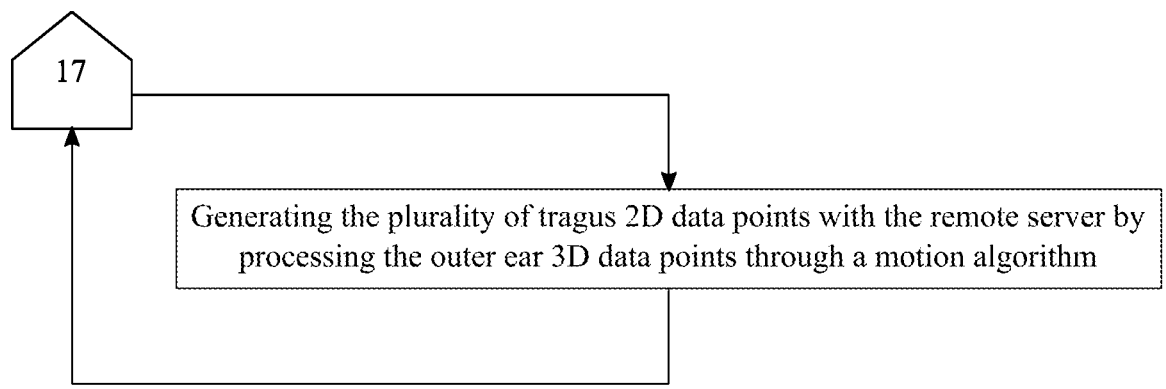
FIG. 18 is a flowchart illustrating one embodiment of the subprocess from FIG. 17.

In one embodiment of the aforementioned subprocess and with reference to FIG. 18, the remote server generates the plurality of tragus 2D data points by processing the outer ear 3D data points 4 through a motion algorithm. In further detail, a multi-view structure from the motion algorithm is used to obtain ear landmark 3D coordinates.

Figure 19:
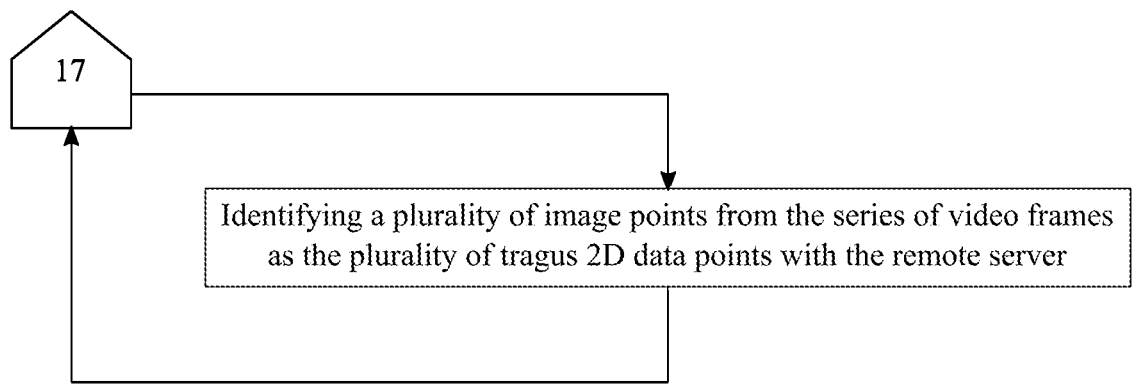
FIG. 19 is a flowchart illustrating another embodiment of the subprocess from FIG. 17.

Alternatively and with reference to FIG. 19, the remote server identifies a plurality of image points from the series of video frames as the plurality of tragus 2D data points. In further detail, the plurality of image points of the tragus landmarks 8 are tracked from video frame to video frame on all video frames.

Figure 21:
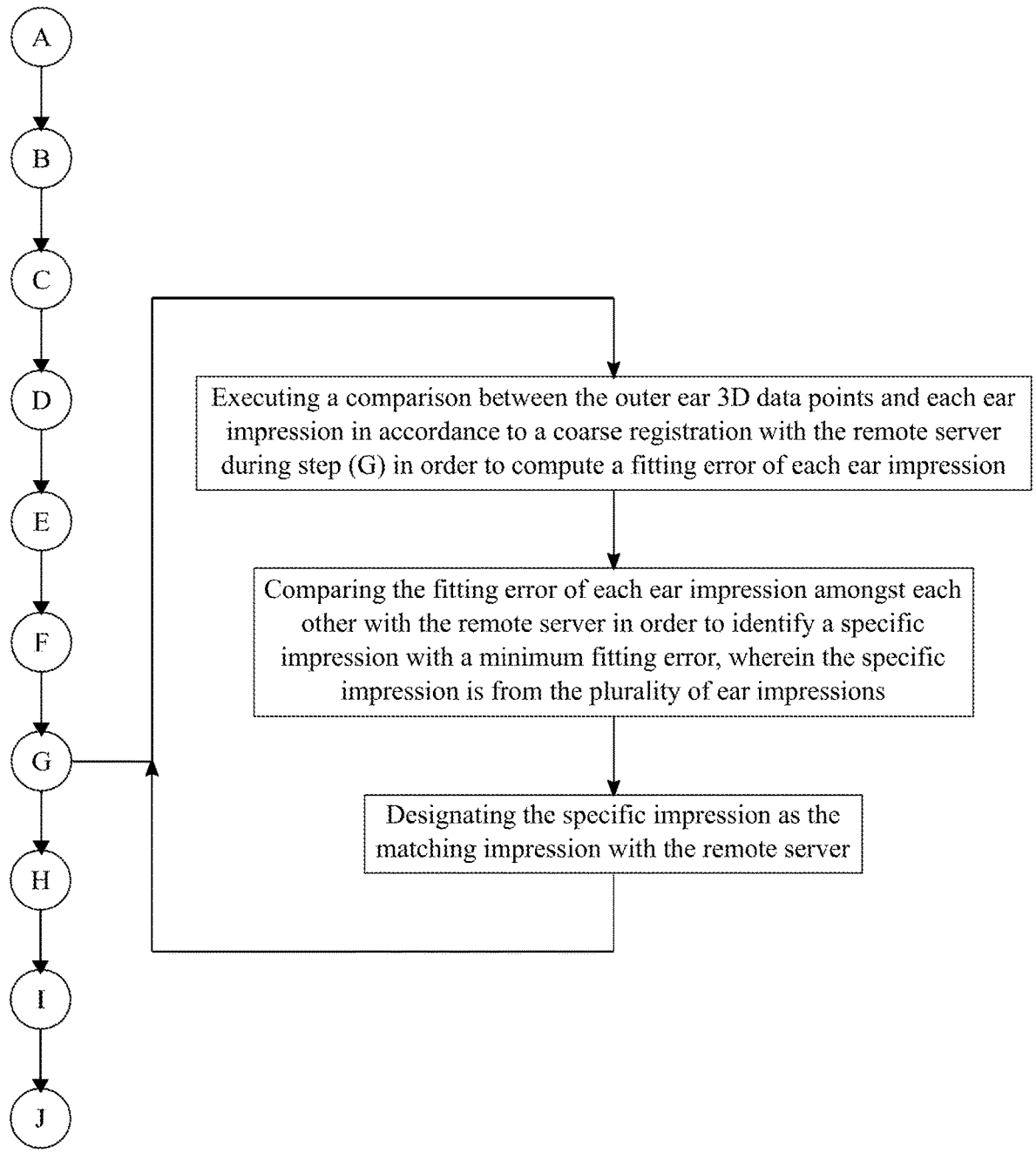
FIG. 21 is a flowchart illustrating the subprocess for a first step of a three-step registration process.
Figure 23:
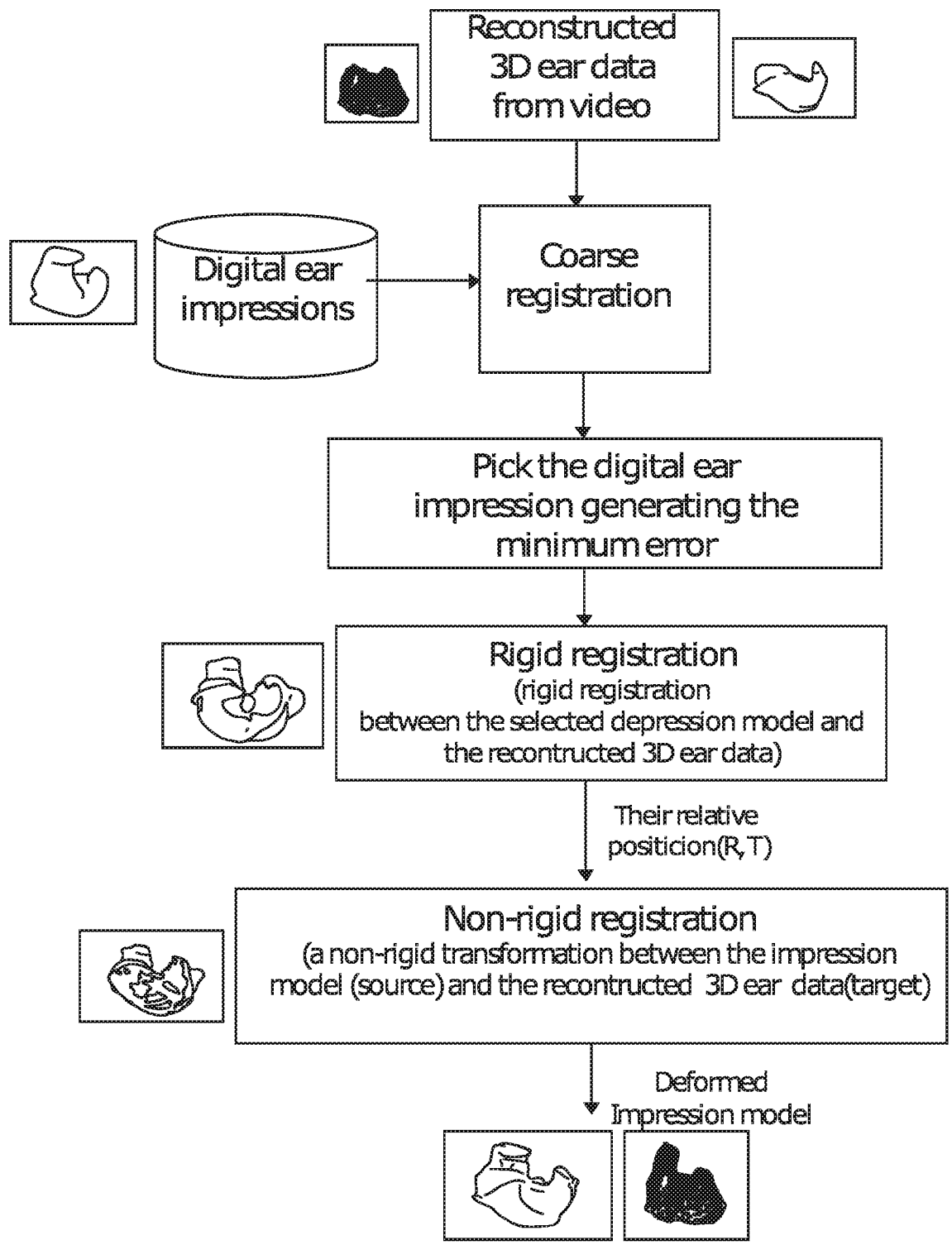
FIG. 23 is a diagram illustrating the entire three-step registration process.

With reference to FIGS. 21 and 23, the following subprocess is the first step of a three-step registration process in order to identify the matching impression. The remote server executes a comparison between the outer ear 3D data points 4 and each 3D digital ear impression in accordance to a coarse registration during Step G in order to compute a fitting error of each 3D digital ear impression. In further detail, the remote server calculates the fitting error between the outer ear 3D data points 4 and the data points of each 3D digital ear impression. Then, the remote server compares the fitting error of each 3D digital ear impression amongst each other in order to identify a specific impression with a minimum fitting error. The specific impression is from the plurality of 3D digital ear impressions. Thus, the remote server is able to identify a 3D digital ear impression from the plurality of 3D digital ear impressions that most matches the target ear 1 based on the minimum fitting error. The remote server designates the specific impression as the matching impression. Thus, the matching impression is identified in the first step of the three-step registration process. Coarse registration identifies a rigid iterative closest point (ICP) registration process for fine alignment between each 3D digital ear impression and the outer ear 3D data points 4. The Thin Plate Spline (TPS) based non-rigid registration deforms the selected source to the target ear 1 in the ear base region.

Figure 22:
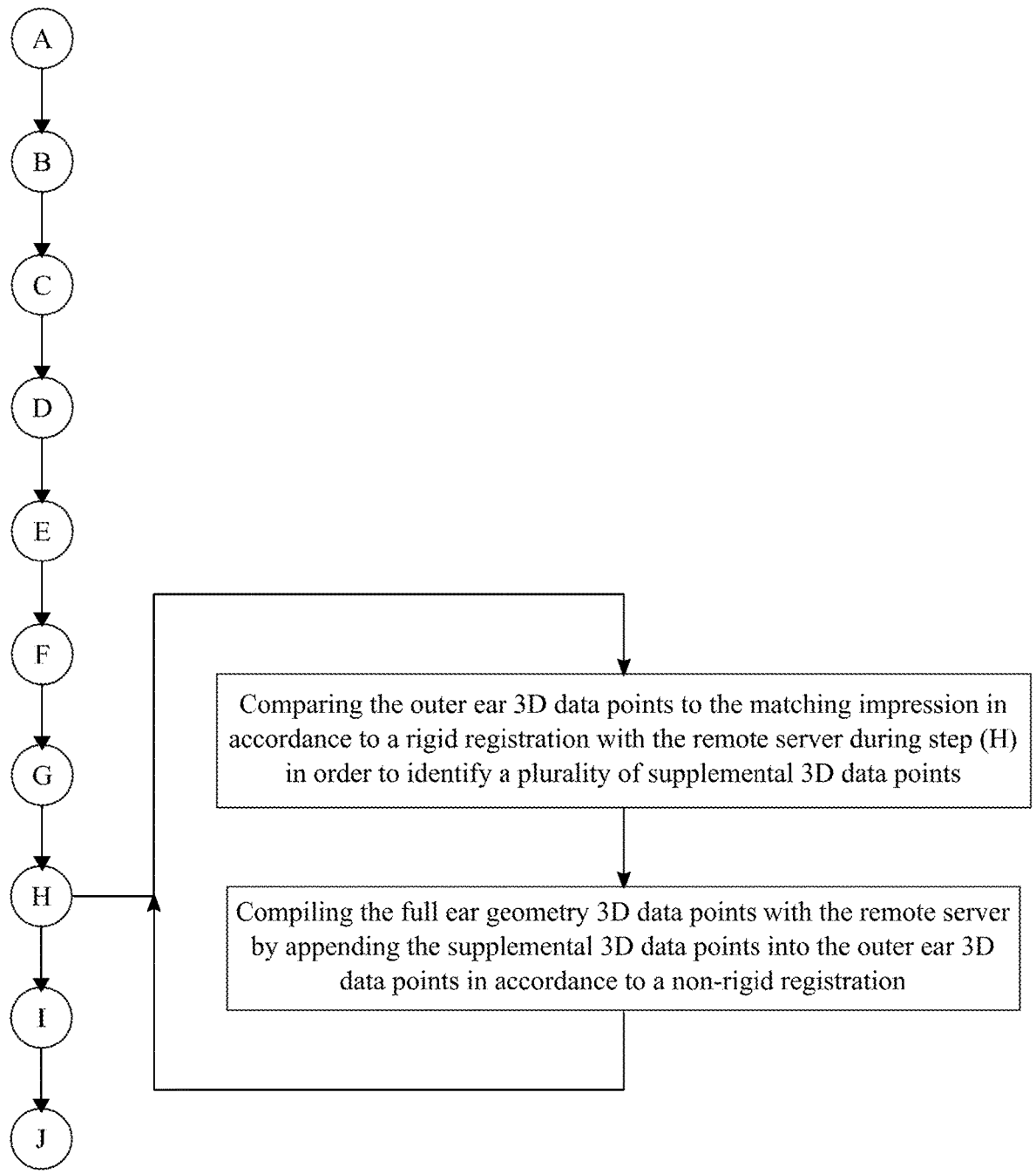
FIG. 22 is a flowchart illustrating the subprocess for a second and third step of a three-step registration process.

With reference to FIGS. 22 and 23, the following subprocess is the second and third steps of the three-step registration process in order to compile the full ear geometry 3D data points. The remote server compares the outer ear 3D data points 4 to the matching impression in accordance to a rigid registration during Step H in order to identify a plurality of supplemental 3D data points. In further detail, The supplemental 3D data points are extracted 3D data points from the matching impression that would be used as the canal 3D data points for the target ear 1. In one embodiment, the rigid registration uses a multi-dimensional feature descriptor to find the initial rigid transformation between the matching impression and the outer ear 3D data points 4. Alternatively, the rigid registration finds the optimal transformation between the matching impression and the outer ear 3D data points 4 by minimizing a distance error metric. Then, the remote server compiles the full ear geometry 3D data points by appending the supplemental 3D data points into the outer ear 3D data points 4 in accordance to a non-rigid registration. The non-rigid registration uses TPS to generate a smooth spatial deformation between the supplemental 3D data points and the outer ear 3D data points 4.

Figure 24:
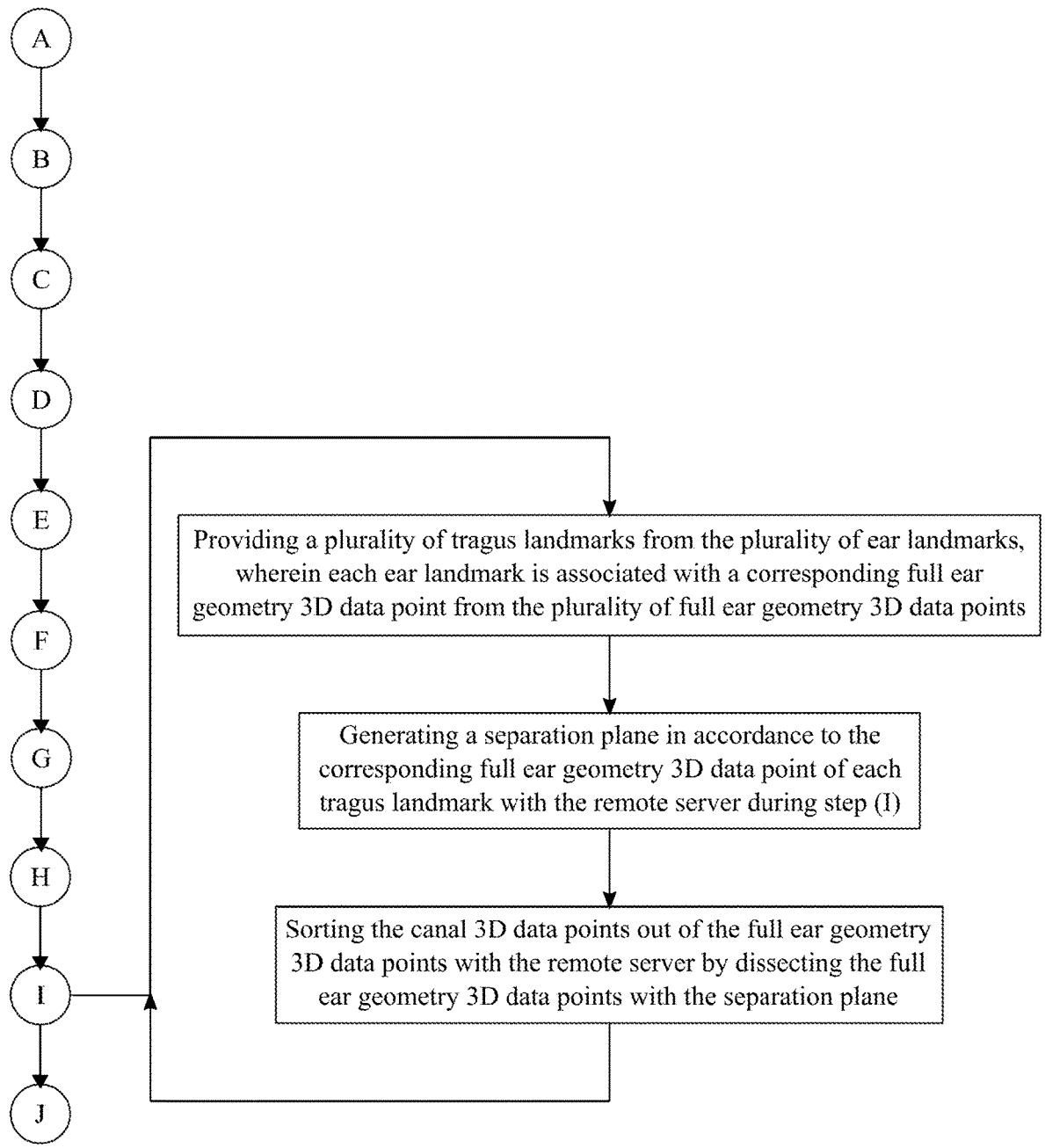
FIG. 24 is a flowchart illustrating one subprocess for segmenting the canal 3D data points from the full ear geometry 3D data points.

With reference to FIG. 24, the following subprocess is one method on how the canal 3D data points are separated from the full ear geometry 3D data points in order to adjust the canal 3D data points. The remote server generates a separation plane in accordance to the corresponding full ear geometry 3D data point of each tragus landmark during Step I. In further detail, the separation plane is formed by a group of tragus landmarks 8. The remote server sorts the canal 3D data points out of the full ear geometry 3D data points by dissecting the full ear geometry 3D data points with the separation plane. In further detail, the separation plane dissects the 3D reconstruction model, reconstructed with the full ear geometry 3D data points, to separate the ear canal section from the ear base.

Figure 25:
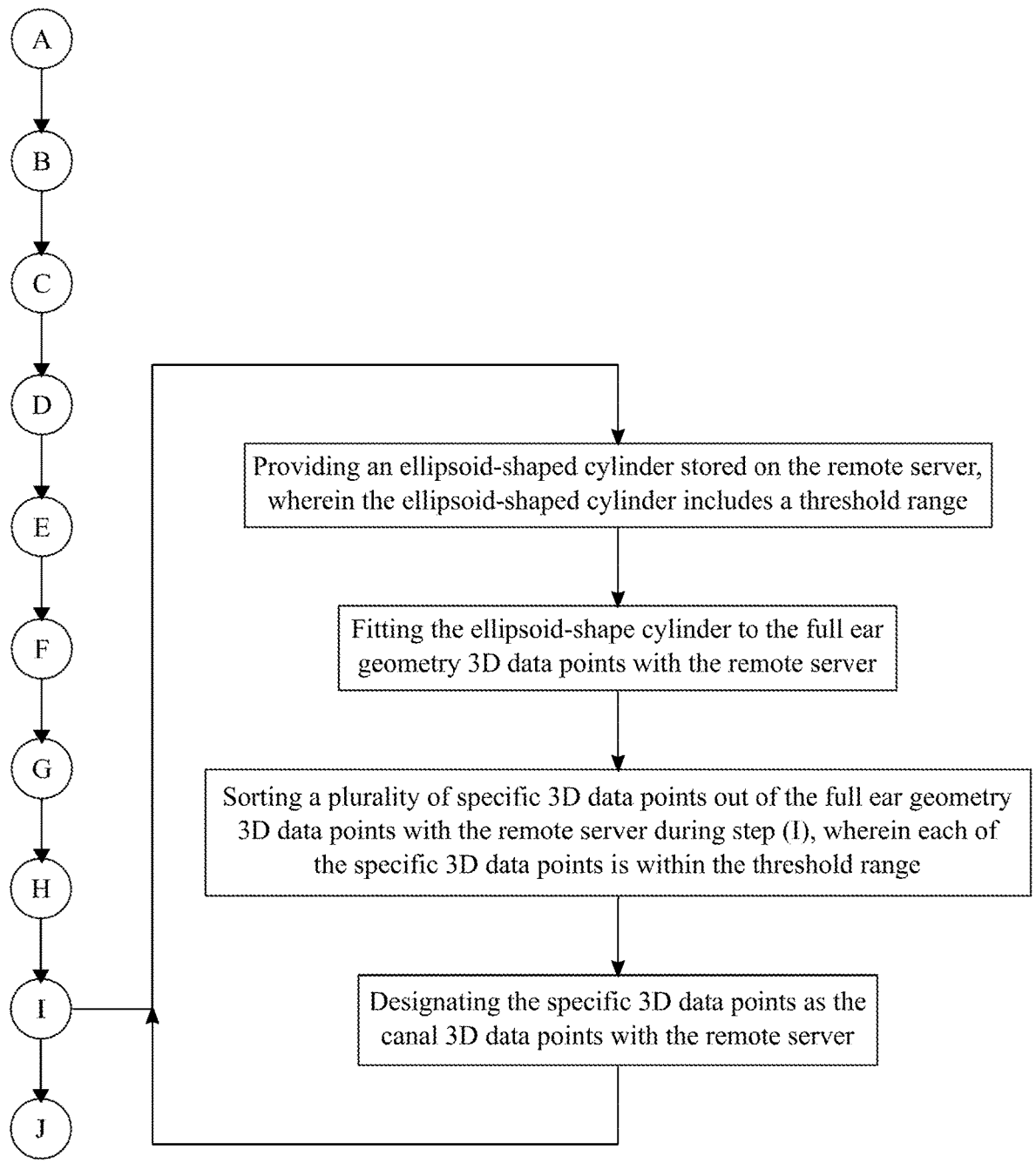
FIG. 25 is a flowchart illustrating another subprocess for segmenting the canal 3D data points from the full ear geometry 3D data points.

With reference to FIG. 25, the following subprocess is another method on how the canal 3D data points are separated from the full ear geometry 3D data points in order to adjust the canal 3D data points. An ellipsoid-shaped cylinder is stored on the remote server and includes a threshold range. The ellipsoid-shaped cylinder is a shape feature that can be used to separate data points. The remote server fits the ellipsoid-shaped cylinder to the full ear geometry 3D data points. In further detail, the ellipsoid-shaped cylinder is fitted onto the digital ear model, reconstructed with the full ear geometry 3D data points. The remote server sorts the plurality of specific 3D data points out of the full ear geometry 3D data points during Step I. Each of the specific 3D data points is within the threshold range. In further detail, the ellipsoid-shaped cylinder segments a canal section from the digital ear model, reconstructed with the full ear geometry 3D data points. The remote server designates the specific 3D data points as the canal 3D data points. Thus, the canal 3D data points are separated from the full ear geometry 3D data points in order for the canal 3D data points to be adjusted.

Figure 26:
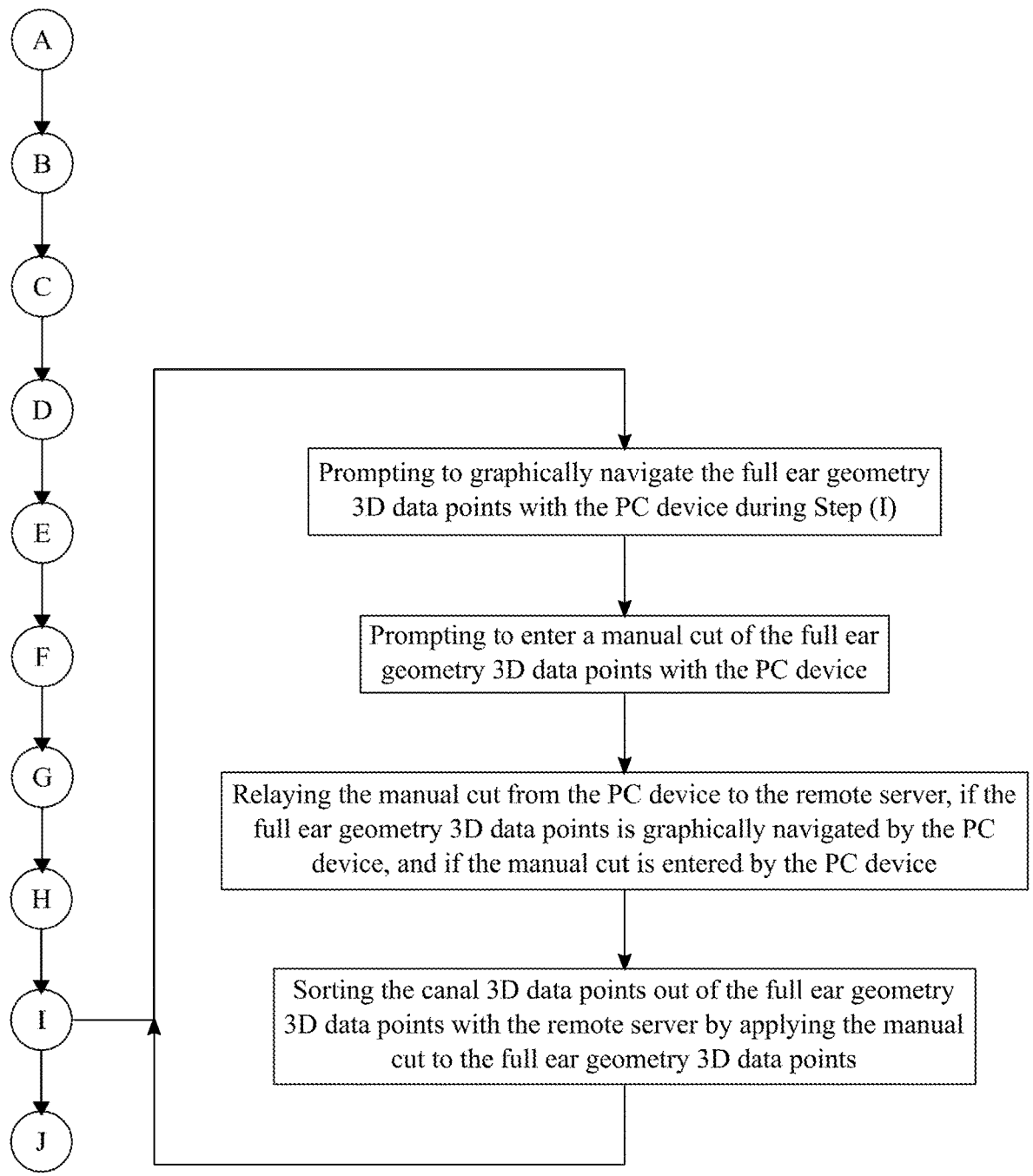
FIG. 26 is a flowchart illustrating another subprocess for segmenting the canal 3D data points from the full ear geometry 3D data points.

With reference to FIG. 26, the following subprocess is another method on how the canal 3D data points are separated from the full ear geometry 3D data points in order to adjust the canal 3D data points. The PC device prompts a user to graphically navigate the full ear geometry 3D data points during Step I. This step provides a user the option to view the 3D reconstruction model, reconstructed with the full ear geometry 3D data points. The PC device then prompts a user to enter a manual cut of the full ear geometry 3D data points. This step provides the user with an option to manually segment the canal region from the digital ear model. The PC device relays the manual cut to the remote server, if the full ear geometry 3D data points are graphically navigated by the PC device, and if the manual cut is entered by the PC device. Thus, the remote server can process the inputted manual cut in order to segment the canal region from the digital ear model. The remote server sorts the canal 3D data points out of the full ear geometry 3D data points by applying the manual cut to the full ear geometry 3D data points. Thus, the canal 3D data points are separated from the full ear geometry 3D data points in order for the canal 3D data points to be adjusted.

Figure 27:
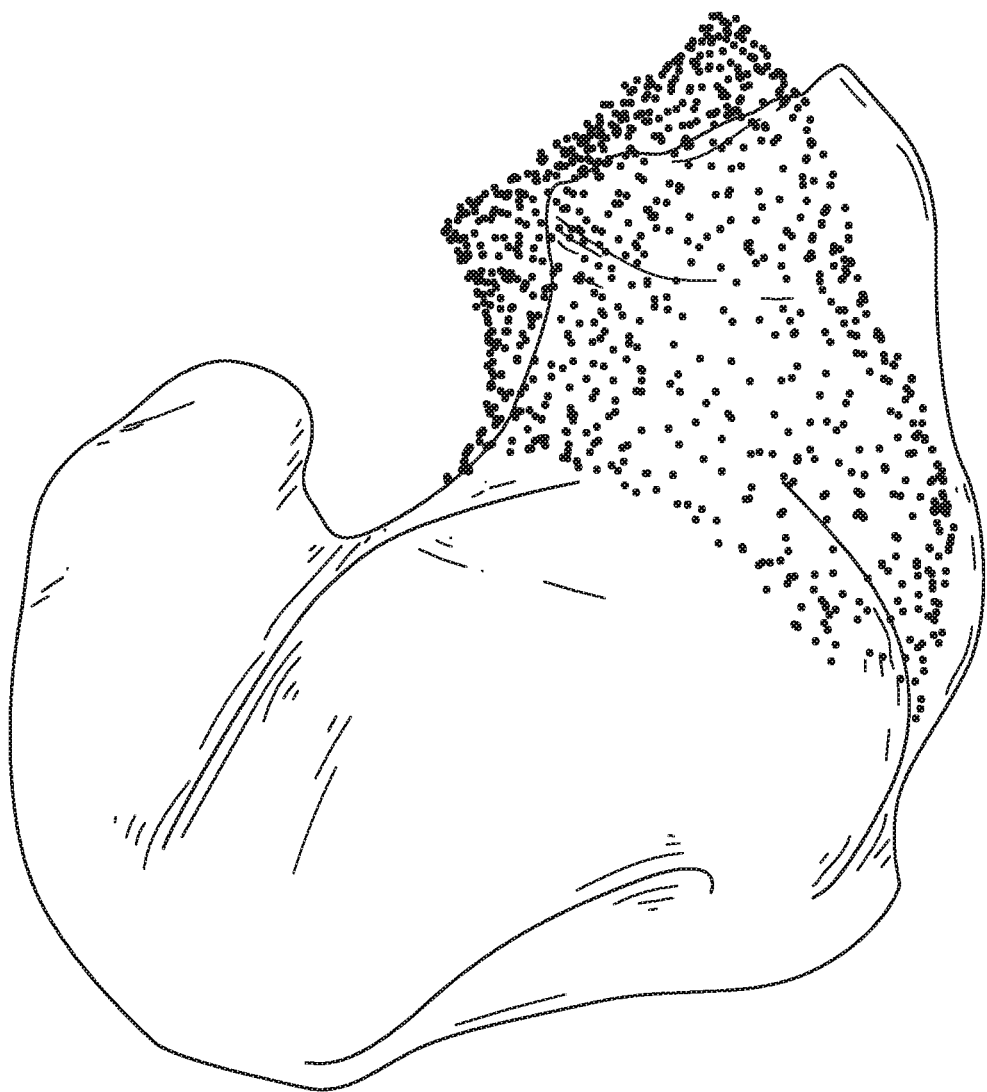
FIG. 27 is a diagram illustrating the adjustment of the canal 3D data points using the tragus angle.

With reference to FIG. 27 and once the canal 3D data points are segmented, the canal 3D data points are then re-orientated with the tragus angle. To ensure the adjusted canal 3D data points is continuous with the outer ear 3D data points 4, the canal 3D data points are also translated or shifted to have the connecting edge points on the ear canal segment to merge with the connecting edge points from the ear base. Final 3D digital ear geometry data points are then reconstructed after adjusting the canal 3D data points with the tragus angle. The final 3D digital ear geometry data model is then used for custom-fit ear shell manufacturing either for hearing aid, hearing protection, or music ear buds.

Although the invention has been explained in relation to its preferred embodiment, it is to be understood that many other possible modifications and variations can be made without departing from the spirit and scope of the invention as hereinafter claimed.

What is claimed is:

1. A method for generating a full three-dimensional (3D) digital geometry for an ear, the method comprises the steps of:
   (A) providing a personal computing (PC) device and at least one remote server, wherein a plurality of 3D digital ear impressions is stored on the remote server;
   (B) retrieving a series of video frames of a target ear with the PC device;
   (C) relaying the series of video frames from the PC device to the remote server;
   (D) processing the series of video frames with the remote server in order to identify a plurality of ear landmarks for the target ear;
   (E) executing a 3D reconstruction process with the remote server in order to generate a plurality of outer ear 3D data points from the ear landmarks;
   (F) processing the outer ear 3D data points with the remote server in order to identify at least one tragus angle for the target ear;
   (G) comparing the outer ear 3D data points to each 3D digital ear impression with the remote server in order to identify a matching impression from the plurality of 3D digital ear impressions;
   (H) registering the outer ear 3D data points to the matching impression with the remote server in order to extrapolate a plurality of full ear geometry 3D data points;
   (I) adjusting a plurality of canal 3D data points in accordance to the tragus angle with the remote server, wherein the full ear geometry 3D points includes the canal 3D data points; and
   (J) compiling the full ear geometry 3D points into a 3D reconstruction model of the target ear with the remote server.

2. The method for generating a full 3D digital geometry for an ear, the method as claimed in claim 1 comprises the steps of:
   providing a reference object, wherein a set of physical dimensions for the reference object is stored on the remote server;
   prompting to capture a video file of the reference object and the target ear with the PC device after step (C);
   relaying the video file from the PC device to the remote server;
   extracting a set of virtual dimensions for the reference object from the video file with remote server;
   comparing the set of virtual dimensions to the set of physical dimensions with the remote server in order to identify a sizing scale; and
   applying the sizing scale to the 3D reconstruction model of the target ear with the remote server.

3. The method for generating a full 3D digital geometry for an ear, the method as claimed in claim 2 comprises the steps of:
   providing the reference object as a quick response (QR) code, wherein the set of physical dimensions is an actual distance between corners on the QR code and is encoded into the QR code;
   retrieving the actual distance between corners by scanning the QR code with the PC device;
   tracking a plurality of corners on the QR code through the video file with the remote server;
   calculating an average distance between corners for the plurality of corners with the remote server; and
   comparing the average distance between corners to the actual distance between corners with the remote server in order to identify the sizing scale.

4. The method for generating a full 3D digital geometry for an ear, the method as claimed in claim 1 comprises the steps of:
   providing a stereoscopic camera system;
   capturing a series of multiple-viewpoint images of the target ear with the stereoscopic camera system;
   relaying the series of multiple-viewpoint images from the stereoscopic camera system to the remote server; and
   executing a range imaging process with the remote server in order to extrapolating a sizing scale for the ear landmarks from the series of the of multiple-viewpoint images.

5. The method for generating a full 3D digital geometry for an ear, the method as claimed in claim 1 comprises the steps of:
   providing a single camera system, wherein the single camera system includes an inertial measurement unit (IMU) sensor;
   capturing a series of single-viewpoint images of the target ear along a traveled path with the single camera system;
   collecting spatial positioning and orientation data of the traveled path with the IMU sensor;

relaying the series of single-viewpoint images and the spatial positioning and orientation data from the single camera system to the remote server; and executing a range imaging process with the remote server in order to extrapolating a sizing scale for the ear landmarks from a combination of the series of the of single-viewpoint images and the spatial positioning and orientation data.

6. The method for generating a full 3D digital geometry for an ear, the method as claimed in claim 1 comprises the steps of:

providing a convolution neural network (CNN) hosted by the remote server, wherein a plurality of ear images is stored on the remote server, and wherein the CNN is computationally trained through the plurality of ear images; and processing the series of video frames with the CNN during step (D) in order to separate the target ear from a background for each video frame.

7. The method for generating a full 3D digital geometry for an ear, the method as claimed in claim 1 comprises the steps of:

providing a CNN hosted by the remote server, wherein a plurality of ear images is stored on the remote server, and wherein each ear image includes a plurality of landmark annotations, and wherein the CNN is computationally trained through the landmark annotations of each ear image; and processing the series of video frames with the CNN during step (D) in order to identify the plurality of ear landmarks for the target ear.

8. The method for generating a full 3D digital geometry for an ear, the method as claimed in claim 1 comprises the steps of:

providing an active shape model stored on the remote server; and comparing the active shape model to each video frame with the remote server during step (D) in order to identify the plurality of ear landmarks for the target ear.

9. The method for generating a full 3D digital geometry for an ear, the method as claimed in claim 1 comprises the steps of:

providing a plurality of tragus landmarks from the plurality of ear landmarks, wherein each ear landmark is associated with a corresponding outer ear 3D data point from the plurality of outer ear 3D data points;

generating a reference plane with the remote server by processing the corresponding outer ear 3D data point of each tragus landmark through a least square plane fitting method; and designating an orientation angle of the reference plane as the tragus angle with the remote server.

10. The method for generating a full 3D digital geometry for an ear, the method as claimed in claim 1 comprises the steps of:

providing a plurality of tragus landmarks from the plurality of ear landmarks, wherein each ear landmark is associated with a corresponding outer ear 3D data point from the plurality of outer ear 3D data points;

providing a plurality of camera views, wherein each camera view includes a viewpoint orientation;

generating a plurality of tragus two-dimensional (2D) data points for each camera view with the remote server by processing the corresponding outer ear 3D data point of each tragus landmark and the viewpoint orientation of each camera view through a lens equation;

computing a fitting error for each camera view with the remote server by processing the tragus two-dimensional (2D) data points for each camera view through a line fitting method;

comparing the fitting error of each camera view amongst each other with the remote server in order to identify a specific view with a minimum fitting error, wherein the specific view is from the plurality of camera views; and designating a tangential orientation to the viewpoint orientation of the specific view as the tragus angle with the remote server.

11. The method for generating a full 3D digital geometry for an ear, the method as claimed in claim 10 comprises the step of:

generating the plurality of tragus 2D data points with the remote server by processing the outer ear 3D data points through a motion algorithm.

12. The method for generating a full 3D digital geometry for an ear, the method as claimed in claim 10 comprises the step of:

Identifying a plurality of image points from the series of video frames as the plurality of tragus 2D data points with the remote server.

13. The method for generating a full 3D digital geometry for an ear, the method as claimed in claim 1 comprises the steps of:

executing a comparison between the outer ear 3D data points and each 3D digital ear impression in accordance to a coarse registration with the remote server during step (G) in order to compute a fitting error of each 3D digital ear impression;

comparing the fitting error of each 3D digital ear impression amongst each other with the remote server in order to identify a specific impression with a minimum fitting error, wherein the specific impression is from the plurality of 3D digital ear impressions; and designating the specific impression as the matching impression with the remote server.

14. The method for generating a full 3D digital geometry for an ear, the method as claimed in claim 1 comprises the steps of:

comparing the outer ear 3D data points to the matching impression in accordance to a rigid registration with the remote server during step (H) in order to identify a plurality of supplemental 3D data points; and compiling the full ear geometry 3D data points with the remote server by appending the supplemental 3D data points into the outer ear 3D data points in accordance to a non-rigid registration.

15. The method for generating a full 3D digital geometry for an ear, the method as claimed in claim 1 comprises the steps of:

providing a plurality of tragus landmarks from the plurality of ear landmarks, wherein each ear landmark is associated with a corresponding full ear geometry 3D data point from the plurality of full ear geometry 3D data points;

generating a separation plane in accordance to the corresponding full ear geometry 3D data point of each tragus landmark with the remote server during step (I); and sorting the canal 3D data points out of the full ear geometry 3D data points with the remote server by dissecting the full ear geometry 3D data points with the separation plane.

16. The method for generating a full 3D digital geometry for an ear, the method as claimed in claim 1 comprises the steps of:

providing an ellipsoid-shaped cylinder stored on the remote server, wherein the ellipsoid-shaped cylinder includes a threshold range;

fitting the ellipsoid-shaped cylinder to the full ear geometry 3D data points with the remote server;

sorting a plurality of specific 3D data points out of the full ear geometry 3D data points with the remote server during step (I), wherein each of the specific 3D data points is within the threshold range; and designating the specific 3D data points as the canal 3D data points with the remote server.

17. The method for generating a full 3D digital geometry for an ear, the method as claimed in claim 1 comprises the steps of:

prompting to graphically navigate the full ear geometry 3D data points with the PC device during Step (I);

prompting to enter a manual cut of the full ear geometry 3D data points with the PC device;

relaying the manual cut from the PC device to the remote server, if the full ear geometry 3D data points is graphically navigated by the PC device, and if the manual cut is entered by the PC device; and sorting the canal 3D data points out of the full ear geometry 3D data points with the remote server by applying the manual cut to the full ear geometry 3D data points.

* * * * *